United States Patent
Josiam et al.

(10) Patent No.: US 9,077,415 B2
(45) Date of Patent: Jul. 7, 2015

(54) APPARATUS AND METHOD FOR REFERENCE SYMBOL TRANSMISSION IN AN OFDM SYSTEM

(71) Applicant: Samsung Electronics Co., Ltd, Suwon-si, Gyeonggi-do (KR)

(72) Inventors: Kaushik Josiam, Dallas, TX (US); Shadi Abu-Surra, Plano, TX (US); Ying Li, Richardson, TX (US); Sridhar Rajagopal, Plano, TX (US); Zhouyue Pi, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 98 days.

(21) Appl. No.: 13/678,795

(22) Filed: Nov. 16, 2012

(65) Prior Publication Data

US 2013/0156120 A1 Jun. 20, 2013

Related U.S. Application Data

(60) Provisional application No. 61/577,533, filed on Dec. 19, 2011, provisional application No. 61/649,838, filed on May 21, 2012.

(51) Int. Cl.
*H04B 7/02* (2006.01)
*H04L 27/00* (2006.01)
(Continued)

(52) U.S. Cl.
CPC ............ *H04B 7/0697* (2013.01); *H04B 7/0617* (2013.01); *H04L 5/0048* (2013.01); *H04L 5/0023* (2013.01); *H04L 25/0204* (2013.01); *H04L 25/0224* (2013.01)

(58) Field of Classification Search
CPC . H04L 1/0625; H04L 1/0631; H04L 27/2626; H04L 27/2647; H04L 2025/03426; H04L 25/0228; H04L 25/03019; H04L 27/2613; H04L 5/0051
USPC ......... 375/260, 267, 285, 295, 299, 316, 340, 375/346–349; 455/562.1, 63.4, 575.7, 132, 455/134–135
See application file for complete search history.

(56) References Cited

U.S. PATENT DOCUMENTS 6,016,123 A * 1/2000 Barton et al. .................. 342/373
6,438,389 B1 * 8/2002 Sandhu et al. .............. 455/562.1
(Continued)

FOREIGN PATENT DOCUMENTS

KR 10-2004-0008692 1/2004

OTHER PUBLICATIONS

International Search Report dated Apr. 30, 2013 in connection with International Application No. PCT/KR2012/011103, 5 pages.
(Continued)

*Primary Examiner* — Khanh C Tran

(57) ABSTRACT

A base station is capable of communicating with a plurality of subscriber stations using a beamforming scheme that varies beams over different time instances. The base station includes a plurality of antenna arrays configured to transmit N spatial beams and carry a reference symbols corresponding to specific spatial beams. The base station also includes $N_{RF}$ number of radio frequency (RF) processing chains coupled to respective ones of the plurality of antenna arrays, wherein $N \gg N_{RF}$. The subscriber station includes $M_{RF}$ processing receive paths configured to receive M number of beams from the base station.

25 Claims, 23 Drawing Sheets

(51) Int. Cl.
*H04B 7/06* (2006.01)
*H04L 5/00* (2006.01)
*H04L 25/02* (2006.01)

(56) References Cited

U.S. PATENT DOCUMENTS

| | | | |
|---|---|---|---|
| 8,306,574 B2 * | 11/2012 | Warner et al. | 455/562.1 |
| 8,385,305 B1 * | 2/2013 | Negus et al. | 370/338 |
| 2006/0270343 A1 | 11/2006 | Cha et al. | |
| 2007/0093274 A1 * | 4/2007 | Jafarkhani et al. | 455/562.1 |
| 2007/0285312 A1 | 12/2007 | Gao et al. | |
| 2009/0322613 A1 * | 12/2009 | Bala et al. | 342/373 |
| 2010/0310002 A1 | 12/2010 | Lauer et al. | |
| 2011/0053646 A1 | 3/2011 | Kundmann et al. | |
| 2012/0309325 A1 * | 12/2012 | Carbone et al. | 455/73 |

OTHER PUBLICATIONS

Written Opinion of International Searching Authority dated Apr. 30, 2013 in connection with International Application No. PCT/KR2012/011103, 6 pages.

* cited by examiner

APPARATUS AND METHOD FOR REFERENCE SYMBOL TRANSMISSION IN AN OFDM SYSTEM

CROSS-REFERENCE TO RELATED APPLICATION(S) AND CLAIM OF PRIORITY

The present application claims priority to U.S. Provisional Patent Application No. 61/577,533, filed Dec. 19, 2011, entitled "METHOD AND APPARATUS FOR REFERENCE SYMBOL TRANSMISSION IN AN OFDM SYSTEM" and U.S. Provisional Patent Application No. 61/649,838, filed May 21, 2012, entitled "METHOD AND APPARATUS FOR SPATIAL STAGGERING OF REFERENCE SYMBOLS AND CHANNEL ESTIMATION". The above-identified patent documents are hereby incorporated by reference.

TECHNICAL FIELD

The present application relates generally to transmitting reference symbols and, more specifically, to a system and method for reference symbol transmission in an OFDM system.

BACKGROUND

Mobile communication has been one of the most successful innovations in modern history. In recent years, the number of subscribers to mobile communication services has exceeded 5 billion and is growing fast. At the same time, new mobile communication technologies have been developed to satisfy the increasing needs and to provide more and better mobile communication applications and services. Some examples of such systems are cdma2000 1xEV-DO systems developed by 3GPP2, WCDMA, HSPA, and LTE systems developed by 3GPP, and mobile WiMAX systems developed by IEEE.

SUMMARY

A base station capable of communicating with a plurality of subscriber station using a beamforming scheme is provided. The base station includes a plurality of antenna arrays configured to transmit N spatial beams. The base station also includes $N_{RF}$ number of radio frequency (RF) processing chains coupled to respective ones of the plurality of antenna arrays, wherein $N>>N_{RF}$.

A method for beamforming is provided. The method includes transmitting N spatial beams by $N_{RF}$ number of radio frequency (RF) processing chains, wherein $N>>N_{RF}$.

A subscriber station capable of communicating with at least one base station using a beamforming scheme is provided. The subscriber station includes a plurality of antenna arrays configured to receive M spatial beams. The subscriber station also includes $M_{RF}$ number of radio frequency (RF) processing chains coupled to respective ones of the plurality of antenna arrays, wherein $M>>M_{RF}$.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device may be implemented in hardware that is programmable by firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
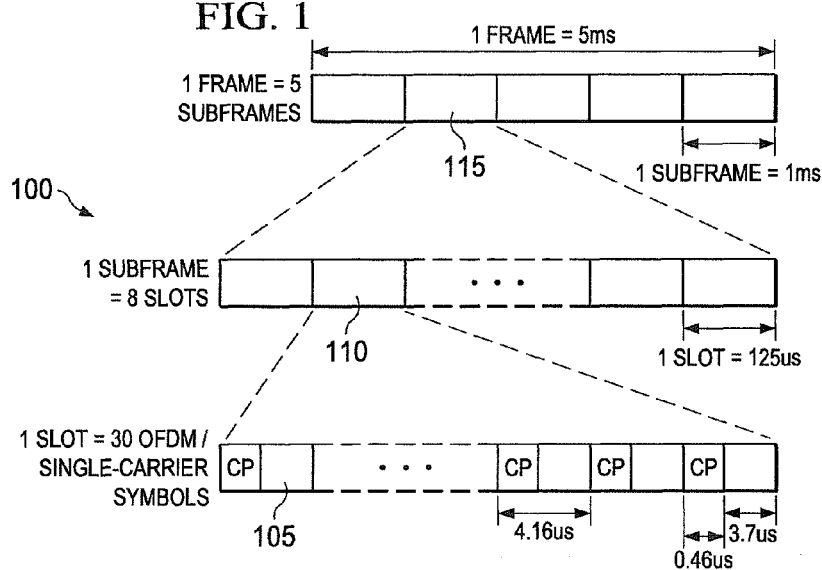
FIG. 1 illustrates a frame structure for a 5G system according to embodiments of the present disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Millimeter waves refer to radio waves with wavelength in the range of 1 mm-10 mm, which corresponds to radio frequency of 30 GHz-300 GHz. These radio waves exhibit unique propagation characteristics as discussed in "Millimeter wave propagation: Spectrum management implications", Federal Communications Commission, Office of Engineering and Technology, Bulletin Number 70, July, 1997, the contents of which are hereby incorporated by reference. For example, compared with lower frequency radio waves, millimeter waves suffer higher propagation loss, have poorer ability to penetrate objects, such as buildings, walls, foliage, and are more susceptible to atmosphere absorption, deflection and reflection due to particles (e.g., rain drops) in the air. Alternatively, due to their smaller wave lengths, more antennas can be packed in a relative small area, thus enabling high-gain antennas in a small form factor. In addition, due to the aforementioned deemed disadvantages, these radio waves have been less utilized than the lower frequency radio waves. This also presents unique opportunities for new businesses to acquire the spectrum in this band at a lower cost. The frequencies are defined in 3 GHz-30 GHz as SHF (Super High Frequency). Note that some higher frequencies in the SHF band also exhibit similar behavior as radio waves in the EHF band (i.e., millimeter waves), such as large propagation loss and the possibility of implementing high-gain antennas in small form factors.

Vast amount of spectrum are available in the millimeter wave band. For example, the frequencies around 60 GHz, which are typically referred to as 60 GHz band, are available as unlicensed spectrum in most of the countries. In the United States, 7 GHz of spectrum around 60 GHz (57 GHz-64 GHz) is allocated for unlicensed use. On Oct. 16, 2003, the Federal Communications Commission (FCC) allocated 12.9 GHz of spectrum for high-density fixed wireless services in the United States (71-76 GHz, 81-86 GHz, and 92-95 GHz excluding the 94.0-94.1 GHz for Federal Government use). The frequency allocation in 71-76 GHz, 81-86 GHz, and 92-95 GHz are collectively referred to as the E-band. E-band is the largest spectrum allocation ever by FCC—50 times larger than the entire cellular spectrum.

Certain systems use millimeter wave wireless communication using component electronics. Several systems may be able to achieve giga-bps data rate. For example, certain systems (system one) include a millimeter wave communication system that enables 10 Gbps data transfer over distances of several kilometers. In such systems, a transceiver is based on photonics, which provides flexibility of operating in a variety of millimeter wave bands such as 140 GHz (F-Band), 94 GHz (W-Band), 70/80 GHz (E-Band), and 35 GHz (Ka-Band). As another example, a second system (system two) includes a multi-gigabit wireless technologies for the 70 GHz and 80 GHz band. However, these technologies are not suitable for commercial mobile communication due to issues such as cost, complexity, power consumption, and form factor. For example, system two's 1.25 gigabit per second wireless radio requires a two-foot antenna to achieve the antenna gain required for the point-to-point link quality. The component electronics used in these systems, including power amplifiers, low noise amplifiers, mixers, oscillators, synthesizers, waveguides, are too big in size and consume too much power to be applicable in mobile communication.

Recently, many engineering and business efforts have been and are being invested to utilize the millimeter waves for short-range wireless communication. In certain systems, technologies and standards are used to transmit data at giga-bps rate using the unlicensed 60 GHz band within a few meters (up to 10 meters). Several industrial standards have been developed, such as, WirelessHD technology as referenced in Zhouyue Pi, Farooq Khan, "An introduction to millimeter-wave mobile broadband systems", IEEE Communications Magazine, June 2011 (the contents of which are incorporated by reference in its entirety), ECMA-387 as referenced in 3GPP TS 36.201: "Evolved Universal Terrestrial Radio Access (E-UTRA); Physical Layer—General Description" (the contents of which are incorporated by reference in its entirety), and IEEE 802.15.3c as referenced in 3GPP TS 36.211: "Evolved Universal Terrestrial Radio Access (E-UTRA); Physical channels and modulation" (the contents of which are incorporated by reference in its entirety), with a number of organizations also actively developing competing short-range 60 GHz giga-bps connectivity technology, such as the Wireless Gigabit Alliance (WGA) and the IEEE 802.11 task group ad (TGad). Integrated circuit (IC) based transceivers are also available for some of these technologies. A common view is that the biggest challenge of short-range 60 GHz connectivity technology is the RFIC. As such, much of the engineering efforts have been invested to develop more power efficient 60 GHz RFICs. Many of the designs and technologies can be transferred to RFIC design for other millimeter wave bands, such as the 70-80-90 GHz band. Although the 60 GHz RFIC today still suffers from low efficiency and high cost, the advancement in millimeter wave RFIC technology points to the direction of higher efficiency and lower cost, which can eventually enable communication over larger distance using millimeter wave RFICs.

Embodiments of the present disclosure illustrate communication systems and associated apparatus and methods that utilize millimeter electromagnetic waves for wireless communication. Although the embodiments are illustrated in the context of communication with millimeter waves, the embodiments are certainly applicable in other communication medium, e.g., radio waves with frequency of 10 GHz-30 GHz that exhibit similar properties as millimeter waves. In some cases, the embodiments are also applicable to electromagnetic waves with terahertz frequencies, infrared, visible light, and other optical media. For illustration purposes, the term "cellular band" refers to frequencies around a few hundred megahertz to a few gigahertz and the "millimeter wave band" refers to frequencies around a few tens of gigahertz to a few hundred gigahertz. Radio waves in cellular bands have less propagation loss and can be better used for coverage purpose but may require large antennas. Alternatively, radio waves in millimeter wave bands suffer higher propagation loss but lend themselves well to high-gain antenna or antenna array design in a small form factor.

FIG. 1 illustrates a frame structure for a 5G system according to embodiments of the present disclosure. The embodiment of the 5G frame 100 shown in FIG. 1 is for illustration only. Other embodiments could be used without departing from the scope of this disclosure. In the example shown in FIG. 1, numeric values are provided for illustration only and other numeric values could be used.

Orthogonal Frequency Division Multiplexing (OFDM) symbols 105 are grouped into a slot 110 for scheduling granularity. For example, thirty OFDM symbols 105 form a slot 110 in a 5G system. Eight slots form a subframe 115 and five subframes form the frame 100. These different granularities like symbol 105, slot 110, subframe 115 and frame 100 illustrate the granularity for transmitting data, control and reference symbols. In the example illustrated, each OFDM symbol 105 is 4.16 μs long. A slot 110, made up of thirty OFDM symbols, is 125 μs long; a subframe 115 is 1 ms long and a frame 100 is 5 ms long. Beamforming is expected to the mainstay of a 5G system, which indicates the directive nature of transmission for both control and data. Directivity depends, among other things, on the location of the mobile station (MS) (also referenced herein as "subscriber station") vis-a-vis the base station (BS), the amount of shadowing and the presence of reflectors in the vicinity. Therefore to identify the optimum direction for transmission between the MS and the BS, some form of training is required. The different directions for transmissions are called beams. MSs have to identify the best beam that can support transmission between the MS and the BS. Embodiments of the present disclosure illustrate the training for the best beamforming direction. Reference symbols are transmitted using beamforming in specific directions. The MS receives reference symbols and processes them to identify the best beam/direction that the transmitter should use if the said transmitter is transmitting to it.

Figure 2:
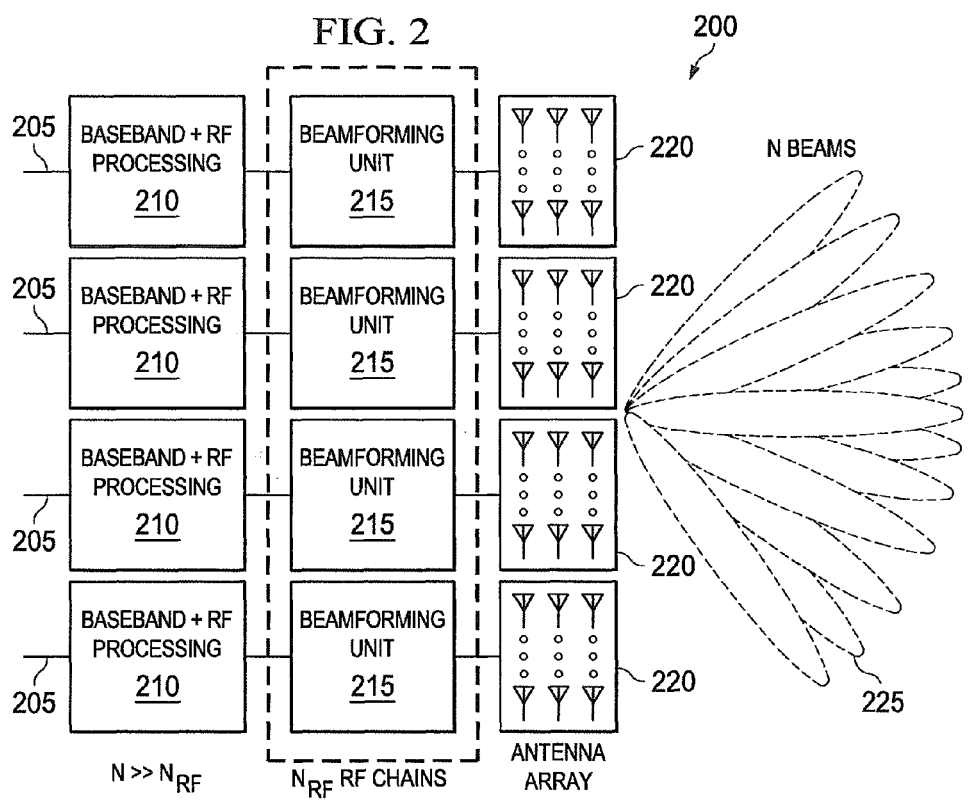
FIGS. 2 and 3 illustrate a base station according to embodiments of the present disclosure.

FIG. 2 illustrates a base station according to embodiments of the present disclosure. The BS 200 of FIG. 2 is configured to employ a transmission scheme where the number of RF chains is much smaller than the number of spatial beams supported and is therefore RF limited. Although certain details will be provided with reference to the components of the BS 200 of FIG. 2, it should be understood that other embodiments can include more, less, or different components. The BS 200 includes a number of digital processing ($N_{RF}$) chains 205 called RF chains or digital chains in this discussion. Each RF chain 205 includes a respective baseband +RF Processing block 210, a beamforming unit 215 and an antenna array 220. Each baseband +RF processing block 210 includes processing circuitry to process signals for transmission. Data to the be transmitted is processed in block 210 using different modules like channel coding, modulation constellation mapping, MIMO processing schemes, digital to analog conversion, and the like. Each baseband +RF processing block 210 is coupled to the beamforming unit 215, which is further coupled to the antenna arrays 220. Each beamforming unit 215 is configured to receive information from a respective baseband +RF processing block 210 and configure the information for a beamforming transmission via the antenna arrays 220.

Embodiment 1

Reference Symbol Transmission for RF Limited Millimeter-Wave Mobile Broadband (MMB) System In certain embodiments, the reference symbols are multiplexed both in frequency and time in BS 200, which includes an OFDM transceiver system that has more antennas 220 than the number of radio frequency processing chains 205. The number of baseband and radio frequency (RF) processing chains 205 is indicative of the processing capabilities of the transceiver system in BS 200. In a transceiver system that possesses more transmit antennas 220 and/or supported spatial directions than the number of RF chains 205, multiple symbols are used to transmit the reference symbols used for channel state information (CSI) measurement at the receiver. The CSI refers to the quality of the channel from the transmitter (e.g., BS 200) to the receiver (e.g. a subscriber station) and is specific to the channel from the transmit antenna 220 or spatial beam at the transmitter to the receive antenna or the spatial beam at the receiver. This channel quality on the specific spatial beam or from the specific transmit antenna 220 to the receiver is measured using reference symbols that are known to the receiver and are transmitted at a pre-defined time period that is implicitly agreed upon between the transmitter BS 200 and the receiver. In a system with $N_{RF}$ transmit RF chains 205 and N spatial beams 225, up to $N_{RF}$ reference symbols are transmitted at one instance of transmission and no greater than $N_{RF}$ reference symbols are transmitted at a transmission instance. Therefore, to transmit reference symbols for all N spatial beams, at least $N/N_{RF}$ transmissions are necessary.

Figure 3:
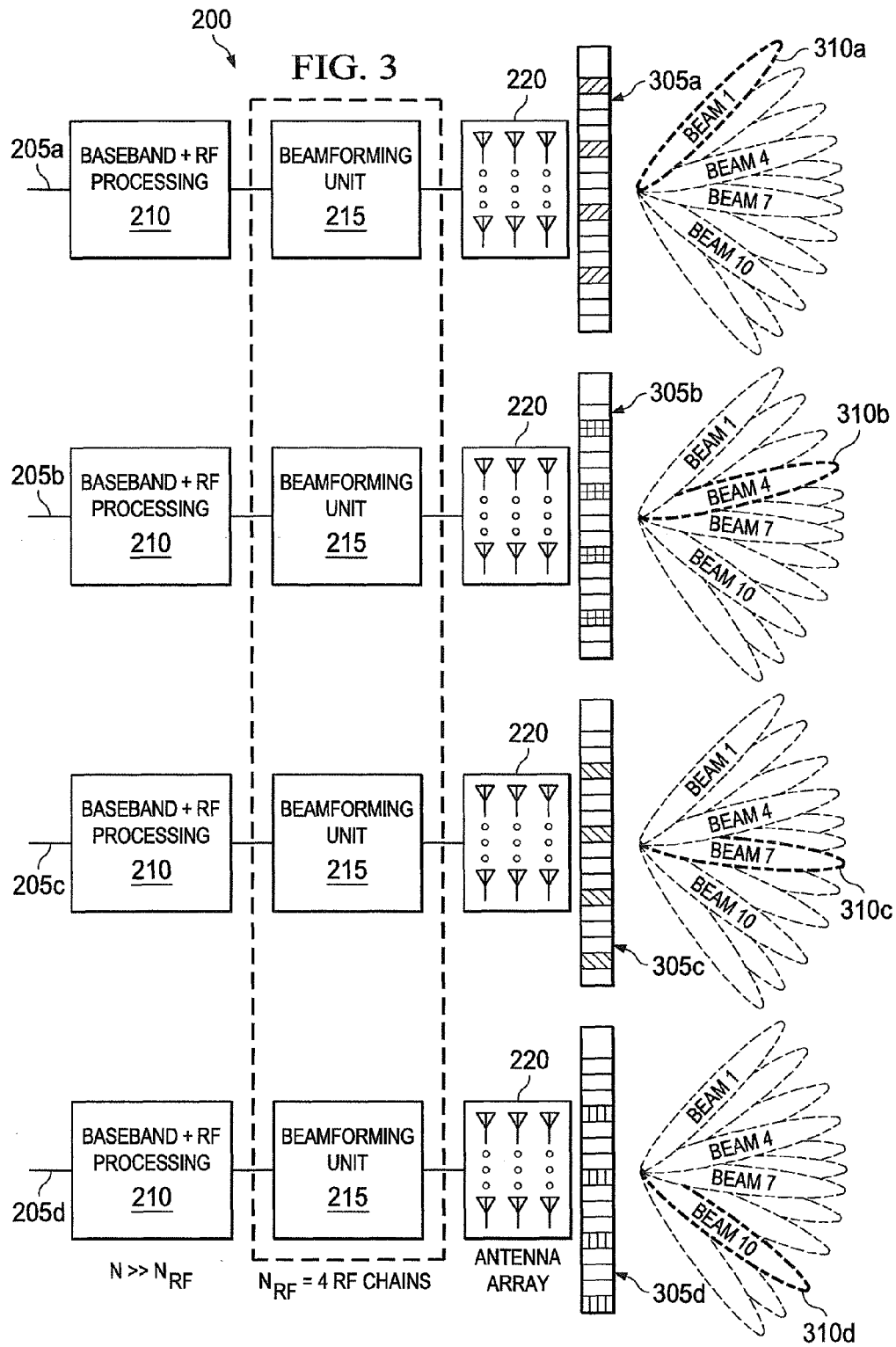

FIG. 3 illustrates a base station according to embodiments of the present disclosure. Although certain details will be provided with reference to the components of the ES 200 of FIG. 3, it should be understood that other embodiments can include more, less, or different components. The ES 200 includes a number ($N_{RF}$) chains 205. Each chain 205 includes a respective baseband +RF Processing block 210, a beamforming unit 215 and an antenna array 220. Each baseband +RF processing block 210 is coupled to the beamforming unit 215, which is further coupled to the antenna arrays 220. The ES 200 of FIG. 3 is configured to multiplex reference symbols corresponding to four spatial beams. Each RF chain 205 carries reference symbol 305 corresponding to a specific spatial beam 310 on subcarrier resources not used by another RF chains 205.

The OFDM transceiver systems has $N_{RF}=4$ RF processing chains 205 and the system supports up to N=12 beams 310. At a given transmission instant, RF chain 1 205a transmits reference symbol 305a corresponding to one spatial beam 310a using some of the frequency subcarriers of the OFDM symbol that may or may not be used by other RF chains. At the same transmission instant, RF chain 2 205b transmits reference symbol 305b corresponding to another spatial beam 310b using some of the frequency subcarriers of the OFDM symbol that may or may not be used by the first RF chain 305 or the other RF chains 205c and 205d. Similarly, the other RF chains 205c and 205d transmit reference symbols 305c and 305d corresponding to different spatial beams 310c and 310d by using frequency subcarriers that are not used by any other RF chains 205.

Figure 4:
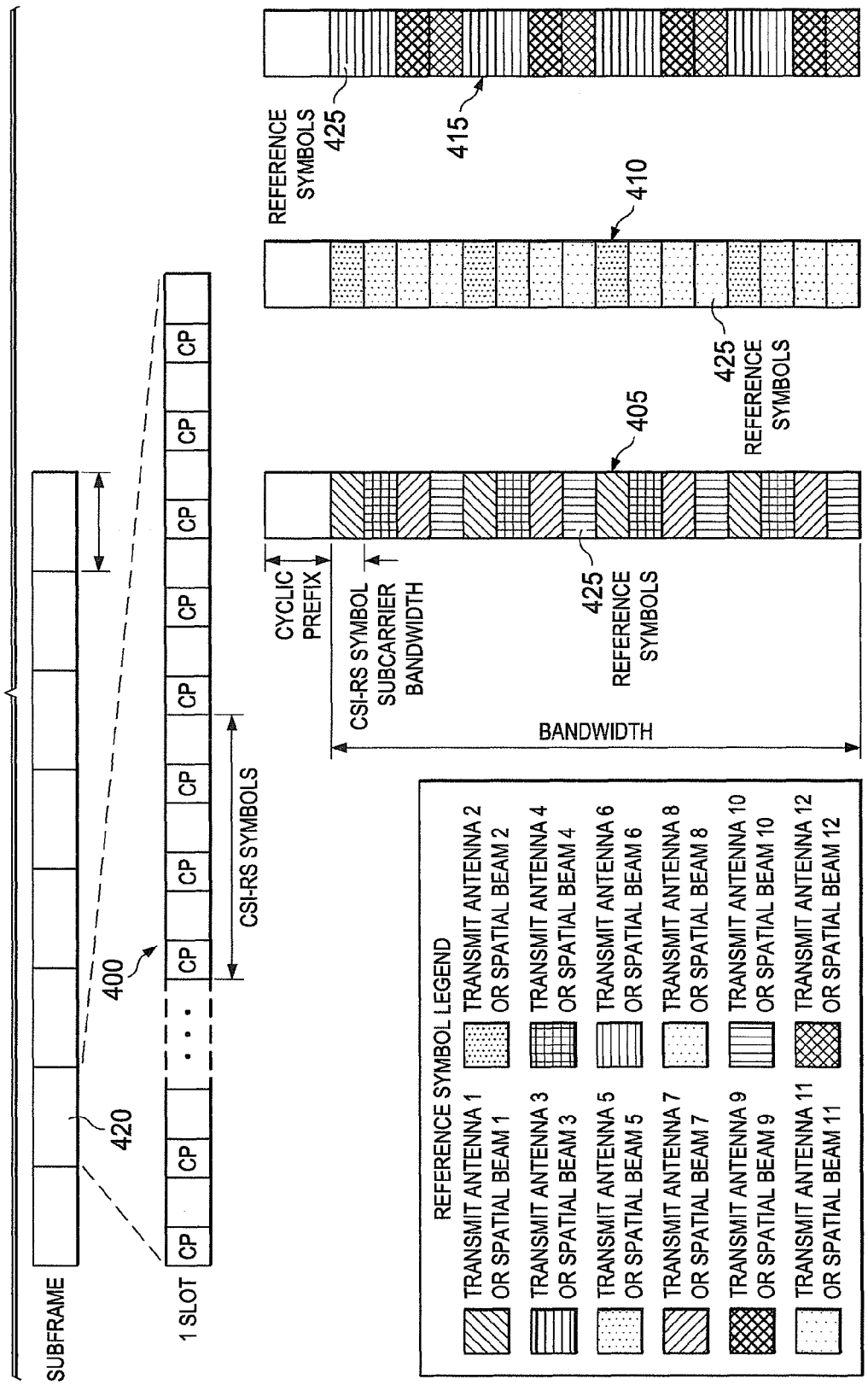
FIG. 4 illustrates a multiplexed Channel State Information-Reference signal (CSI-RS) symbol corresponding to four spatial beams at a transmission instance according to embodiments of the present disclosure.

FIG. 4 illustrates a multiplexed Channel State Information-Reference signal (CSI-RS) symbol corresponding to four spatial beams at a transmission instance according to embodiments of the present disclosure. The example of the multiplexed CSI-RS symbol 400 shown in FIG. 4 is for illustration only. Other embodiments could be used without departing from the scope of this disclosure.

The twelve (12) spatial beams 310 are transmitted in three OFDM symbols 405, 410, 415 of a slot 420 with each OFDM symbol carrying CSI-RS symbols 425 for four spatial beams 310. In an alternate configuration, the twelve spatial beams 310 are transmitted over six OFDM symbols using only two of the $N_{RF}$ RF chains 205. The information regarding the configuration of the CSI-RS symbols includes the number of beams supported and the number of CSI-RS symbols transmitted. This configuration message is transmitted by BS 200 to all MSs as part of the system configuration broadcast message or as a standalone broadcast message. The system can support a plurality of configurations but use only one of the allowed configurations. Therefore, given a configuration, the MS determines the property of the CSI-RS symbol transmitted (spreading code, and the like) and the mapping rule between the received CSI-RS symbols and the transmitted beam directions. In certain embodiments, this information is not transmitted to the receiver but is a priori agreed and is implicit.

Figure 5:
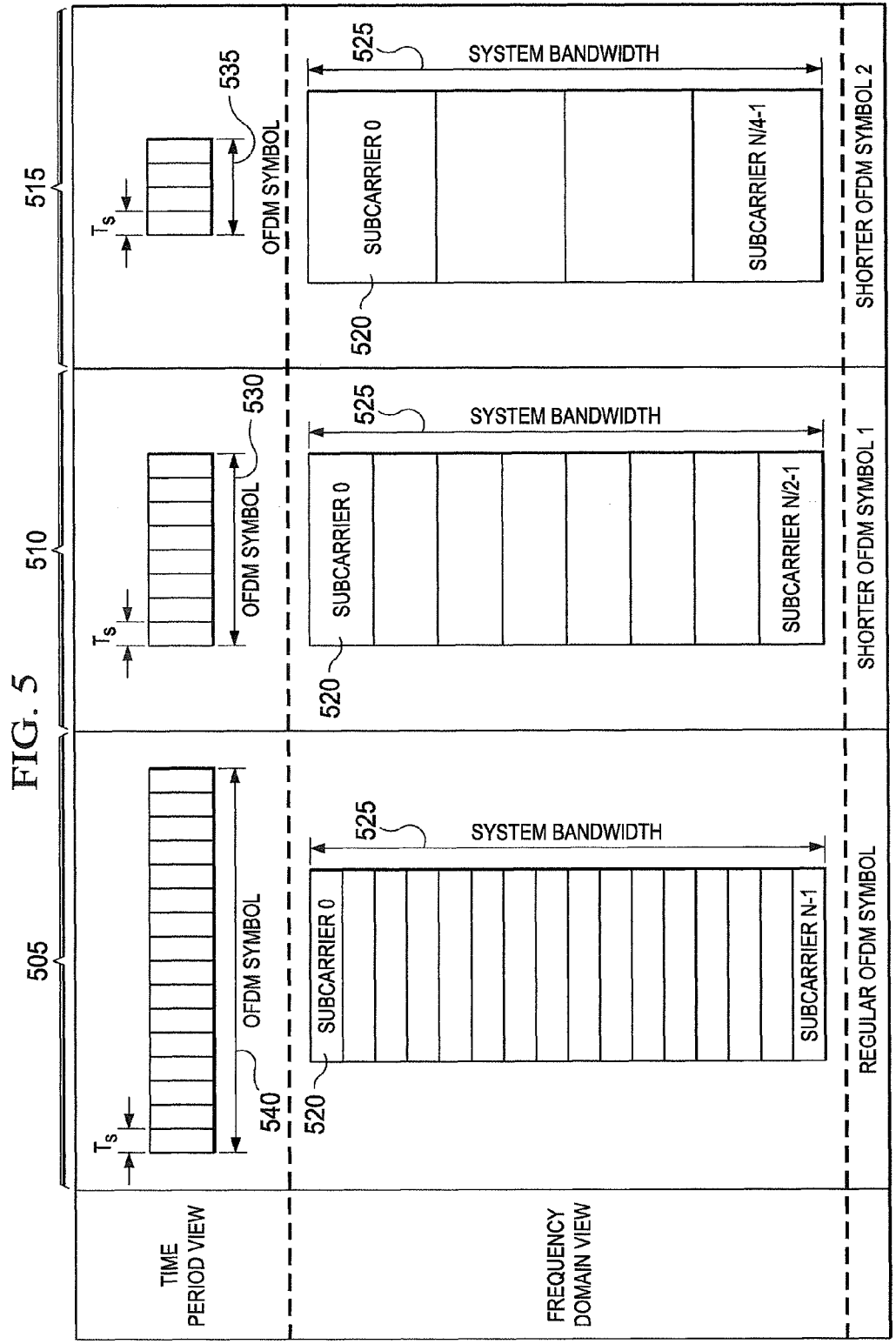
FIG. 5 illustrates a short Orthogonal Frequency Division Multiplexing (OFDM) according to embodiments of the present disclosure.

FIG. 5 illustrates a short Orthogonal Frequency Division Multiplexing (OFDM) symbol according to embodiments of the present disclosure. The embodiments of the shortened OFDM symbols shown in FIG. 5 are for illustration only. Other embodiments could be used without departing from the scope of this disclosure.

In certain embodiments, the duration of the OFDM symbol that carries reference symbols is reduced by using a different and lower FFT/IFFT size than that used for data transmission. The OFDM symbol for reference symbols has fewer subcarriers compared to the OFDM symbols used for data transmission. The OFDM symbols 510 and 515 used for transmitting reference symbols are of shorter duration than the regular OFDM symbols 505 used for data transmission and will henceforth be referred to as shorter OFDM symbols. The subcarriers 520 of the shorter OFDM symbols 505, 515 and those of the regular OFDM symbols 505 span the same bandwidth 525. A shorter OFDM symbol 510, 515 can be derived by using a smaller FFT size than the one used for a regular OFDM symbol 505 used for data transmission. A direct effect of reducing the time period in the shorter OFDM symbols 510, 515 is the increased subcarrier bandwidth as illustrated in FIG. 5. For example, in the short OFDM symbol-1 510, by halving the FFT size, the OFDM symbol duration 530 is reduced by half (as compared to the regular OFDM symbol duration 540), if the same sampling period $T_s$ (Sampling frequency $F_s=1/T_s$) is retained. In regard to the short OFDM symbol-2 515, by reducing the FFT size (N) to a quarter (N/4), the OFDM symbol duration 535 can be reduced to a quarter (as compared to the regulator OFDM symbol duration 540). The two examples for shorter symbol 510, 515 are only exemplary in nature and any other fraction of the FFT size can be used for the shorter OFDM symbol.

Figure 6:
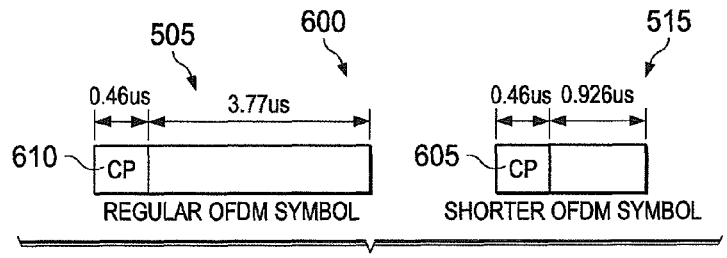
FIG. 6 illustrates a cyclic prefix scheme 600 according to embodiments of the present disclosure.

FIG. 6 illustrates a cyclic prefix scheme 600 according to embodiments of the present disclosure. The embodiment of the cyclic prefix 600 shown in FIG. 6 is for illustration only. Other embodiments could be used without departing from the scope of this disclosure.

Embodiment 3

Keeping the Cyclic Prefix the Same as the Regular OFDM Symbol for the Shorter OFDM Symbol In certain embodiments, the cyclic prefix 605 of the shorter OFDM symbol 515 is kept at the same duration as the regular OFDM symbol 505. That is, the cyclic prefix 605 of the shorter OFDM symbol 515 is the same duration as the cyclic prefix 610 of the regular OFDM symbol 505. The cyclic prefix 605 is designed to be longer than the delay spread of the channel. The delay spread is the time duration during which multiple paths from the transmitter traveling through the channel arrive at the receiver and is measured in seconds. Since the shorter OFDM symbol 515 operates in the same channel as the regular OFDM symbol 505, the cyclic prefix 605 of the shorter OFDM symbol 505 has the same duration as the cyclic prefix 610 of the regular OFDM symbol 505. As illustrated in FIG. 6, the cyclic prefix duration of the regular OFDM symbol 505 is retained in the shorter OFDM symbol 515. The FFT/IFFT size is reduced to a fourth between the regular 505 and shorter OFDM symbol 515 in this example and is reflected in the length of the OFDM symbol 515. However, as shown in the example illustrated in FIG. 5, the number of symbols that make up the cyclic prefix duration of 0.46 µs is retained the same between the regular OFDM symbol 505 and shorter OFDM symbol 515.

Figure 7:
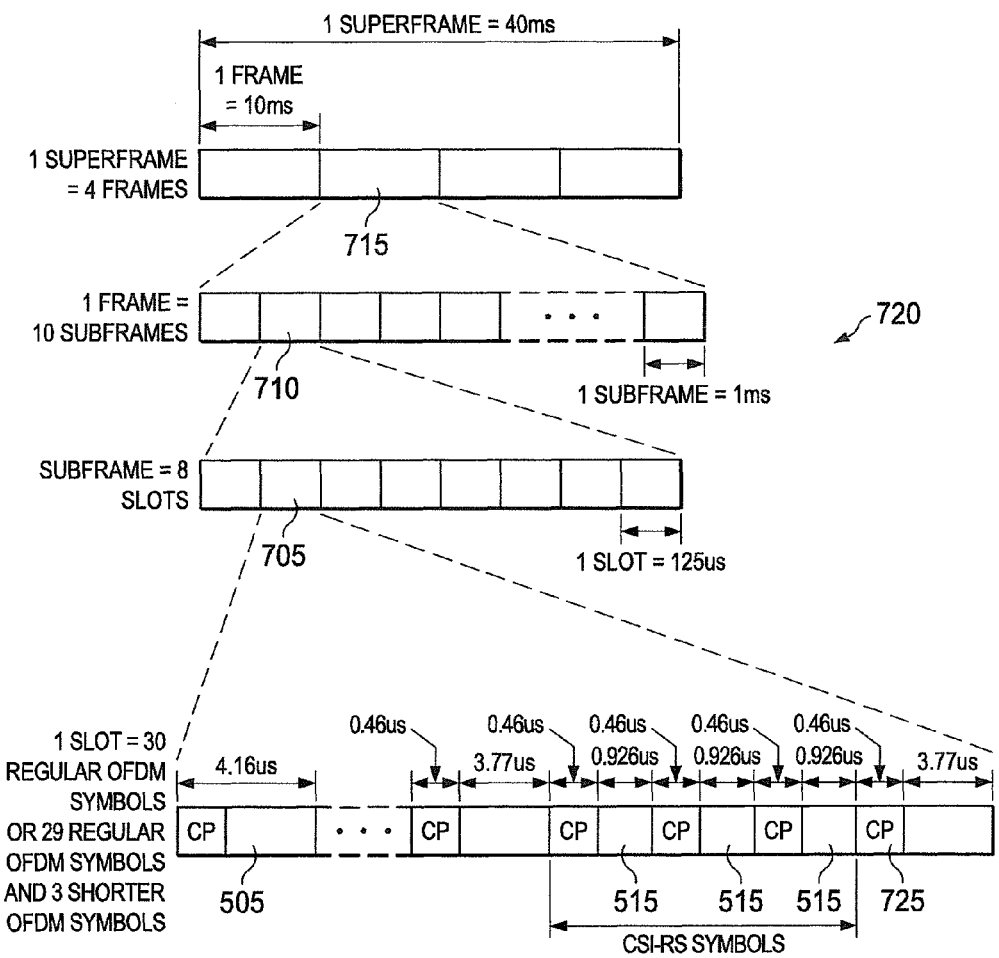
FIG. 7 illustrates shorter OFDM symbols in a frame such that a super-frame, frame, sub-frame and slot duration are maintained according to embodiments of the present disclosure.

FIG. 7 illustrates shorter OFDM symbols in a frame such that a super-frame, frame, sub-frame and slot duration are maintained according to embodiments of the present disclosure. The embodiment of the shorter OFDM symbols shown in FIG. 7 is for illustration only. Other embodiments could be used without departing from the scope of this disclosure.

Embodiment 4

Arrangement of Shorter OFDM Symbol in a Frame for CSI-RS Transmission

In certain embodiments, the shorter OFDM symbols 515 carrying the reference symbols for CSI estimation (CSI-RS) are placed so as to fit the duration of regular OFDM symbols 505 or an integral multiple of the regular OFDM symbol duration so that the durations of a slot 705, sub-frame 710, frame 715 and a super-frame 720 are maintained. The reference symbols are placed over the entire bandwidth of the shorter OFDM symbols 515 to allow users to estimate the frequency selectivity of the channel. Depending upon the length of the shorter OFDM symbol 515, the number of shorter OFDM symbol 515 that can be placed in the duration of the regular OFDM symbol 505 can be determined. If multiple shorter OFDM symbols 505 are used, whose total duration spans an integral multiple of OFDM symbol duration in a slot 705, then those arrangements do not violate the slot 705, sub-frame 710 or frame boundaries 715. In addition, if the arrangement of the shorter OFDM symbols 515 in the slot 705 fits the duration of the slot 705 and does not violate the slot 705 boundary, then the boundary of a sub-frame 710, frame 715 and super-frame 715 are not going to be violated. The shorter OFDM symbol 515 is about fourth of the size of the regular OFDM symbol 505, that is, the duration of the shorter OFDM symbol 505 is 0.926 µs, which is approximately a fourth of the size of a regular OFDM symbol 505, which is 3.77 µs. When the duration of the regular cyclic prefix of 0.46 µs is added to the shorter OFDM symbol 515, then three (3) shorter OFDM symbols 515 fit in the duration of a regular OFDM symbol 505 including the cyclic prefix 725. The slot 705, which otherwise would have thirty (30) regular duration OFDM symbols 505, now has thirty-two (32) OFDM symbols that includes twenty-nine (29) regular OFDM symbols 505 and three (3) shorter OFDM symbols 515. The OFDM symbols 505, 515 have the same cyclic prefix duration. In certain embodiments, both the regular OFDM symbol 505 and the shorter OFDM symbol 515 span the same bandwidth with different bandwidths for each subcarrier. In the example shown in FIG. 7, the subcarrier bandwidth of the shorter OFDM symbol 515 is four times the sub-carrier bandwidth of the regular OFDM symbol 505 when operated at the same sampling frequency.

Figure 8:
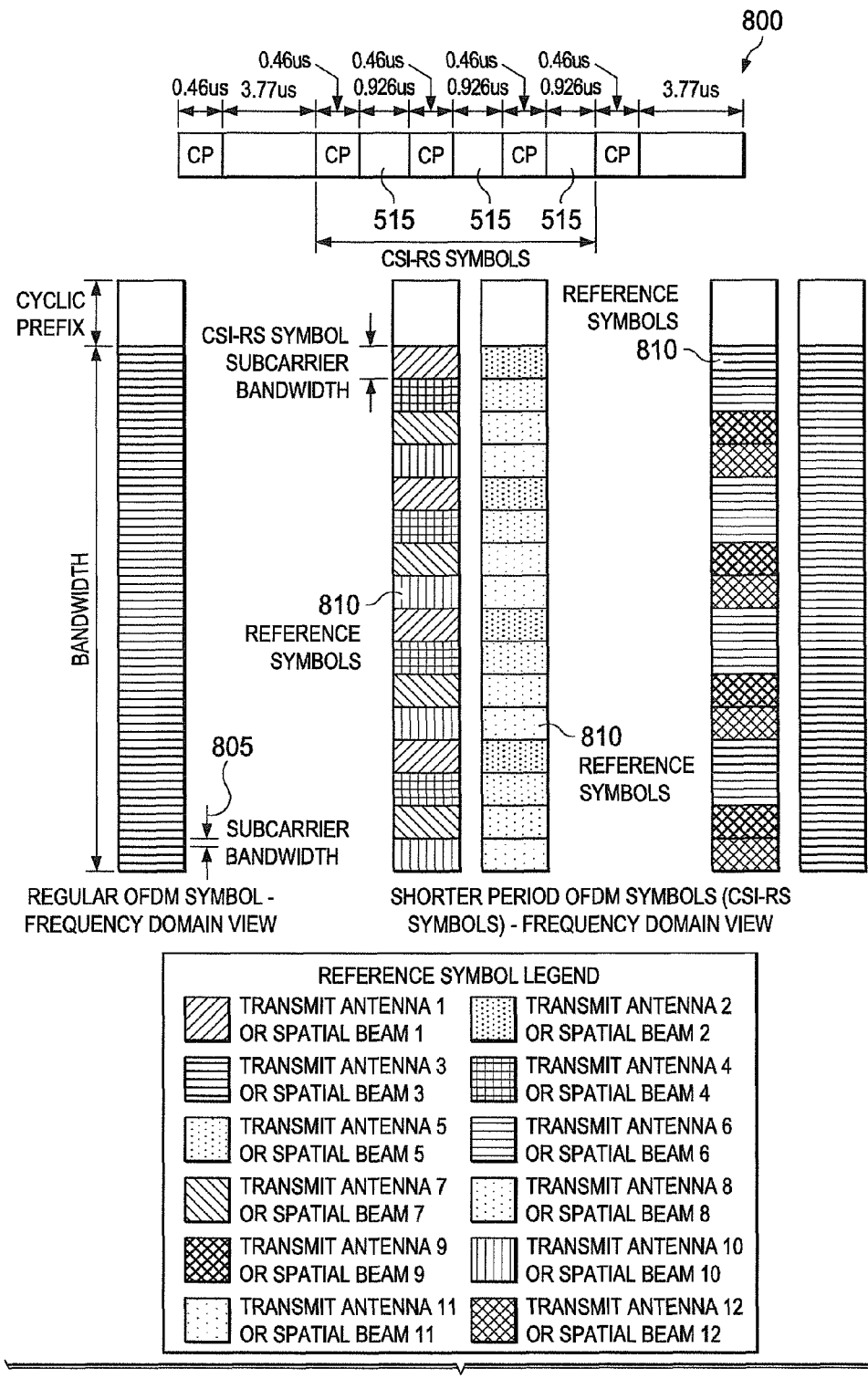
FIG. 8 illustrates reference symbol placement in channel state information—reference signal (CSI-RS) shorter OFDM symbols according to embodiments of the present disclosure.

FIG. 8 illustrates reference symbol placement in channel state information—reference signal (CSI-RS) shorter OFDM symbols according to embodiments of the present disclosure. The embodiment of the reference symbol placement 800 shown in FIG. 8 is for illustration only. Other embodiments could be used without departing from the scope of this disclosure.

Embodiment 5

Placement of CSI-RS Symbols in a Shorter OFDM Symbol

In certain embodiments, the subcarriers of the shorter symbols 515 carry reference symbols 810 known to both the transmitter and receiver to enable estimation of the wireless channel between the transmitter and receiver. In a multiple antenna transmitter, there are as many reference symbols 810 as the number of transmit antennas. These reference symbols 810 corresponding to different antennas 220, are placed on different subcarriers 805 of the shorter OFDM symbol 515 meant for carrying reference symbols. That is, each subcarrier 805 carries a reference symbol 810 for a specific antenna 220. In other wireless communication systems with a large number of transmit antennas; the number of antennas may be too large to accommodate them in the CSI-RS symbols. In these large scale multiple antenna transmitters, the transmitters work together to form a beam in a specific direction. The number of beams that the transmitter can support is a critical feature and each subcarrier carries a reference symbol for a specific beam oriented in a specific spatial direction. In an example illustrated in FIG. 8, the three shorter OFDM symbols 515 carry reference symbols corresponding to twelve antennas or twelve spatial beams 310 with four antennas 220 or spatial beams 310 per OFDM symbol. A reference symbol 810 corresponding to a given antenna 220 or a spatial beam 310 is repeated so as to span the transmission bandwidth enabling the MS to estimate the channel's frequency selectivity. Another example is an arrangement in which multiple reference symbols corresponding to one transmit antenna 220 or spatial beam 310 direction are placed at the appropriate subcarriers so as to span the entire transmission bandwidth. The information regarding the configuration of the CSI-RS symbols includes the number of beams supported and the number of CSI-RS symbols transmitted. This configuration message is transmitted by BS 200 to all MSs as part of the system configuration broadcast message or as a standalone broadcast message. The system can support a plurality of configurations but use only one of the allowed configurations. Therefore, given a configuration, the MS determines the property of the CSI-RS symbol transmitted (spreading code, and the like) and the mapping rule between the received CSI-RS symbols and the transmitted beam directions. In certain embodiments, this information is not transmitted to the receiver but is a priori agreed and is implicit.

Figure 9:
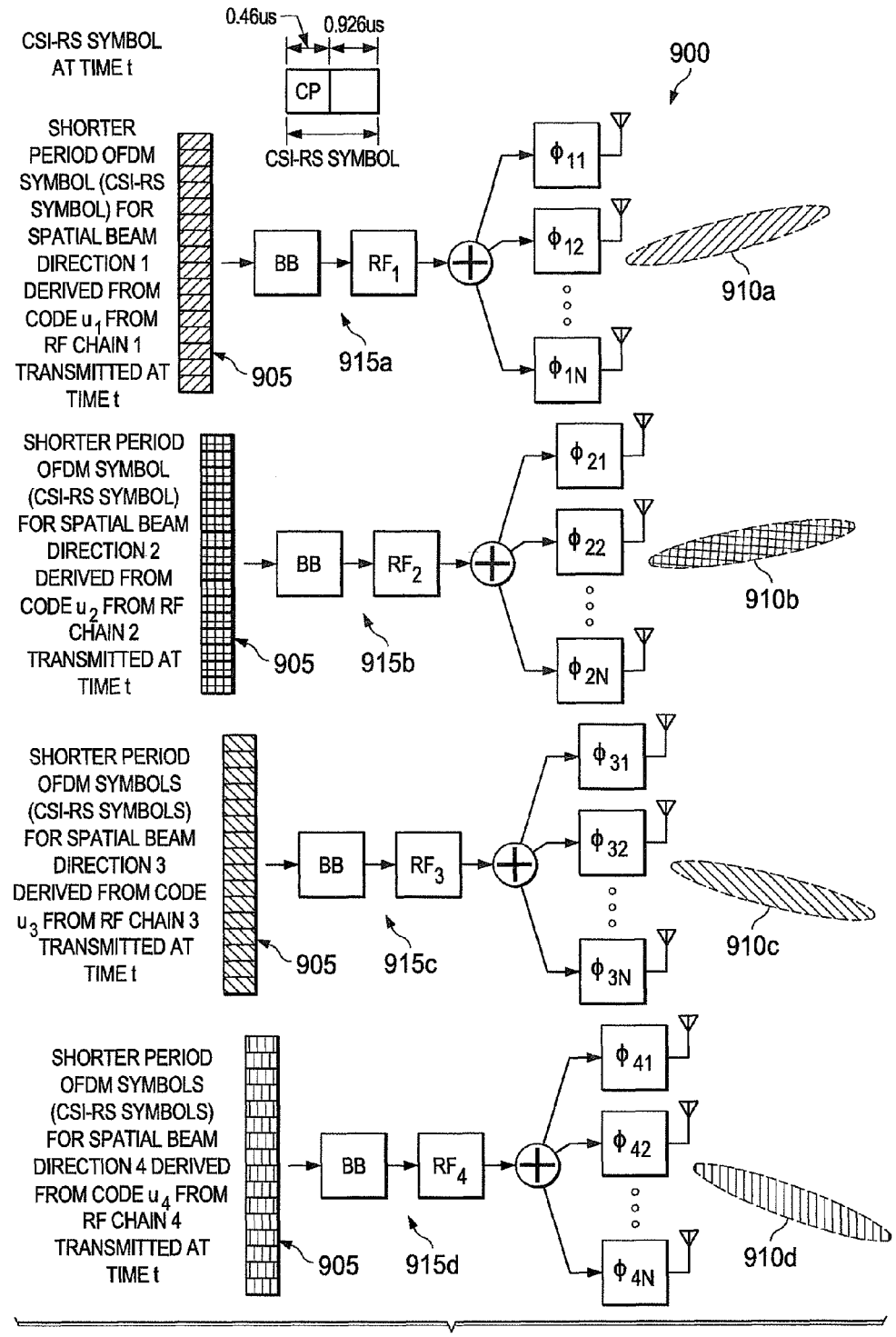
FIG. 9 illustrates a transmitter capable of coding based reference symbol transmission according to embodiments of the present disclosure.

FIG. 9 illustrates a transmitter capable of coding based reference symbol transmission according to embodiments of the present disclosure. The embodiment of the transmitter 900 shown in FIG. 9 is for illustration only. Other embodiments could be used without departing from the scope of this disclosure.

Embodiment 6

Coding of CSI-RS in Shorter OFDM Symbol

In certain embodiments, the reference symbols corresponding to different antennas or different spatial directions are distinguished at the receiver by the property of the transmitted reference symbols. The reference symbols corresponding to a specific spatial beam or a transmit antenna may belong to a family of codes. A code is a sequence of real or complex numbers and a family of codes is a collection of codes with specific properties. A desirable property of the code family used to transmit reference symbols is low cross correlation, low peak-to-average ratio and constant modulus. It is well understood that the above mentioned properties could be augmented by other desirable properties. A code belonging to a code family is used to indicate a specific beam or a transmit antenna and is transmitted as a reference symbole in one of the shorter OFDM symbols 515 used for reference symbol transmission. The receiver decodes the received signal to identify the member of the code family by using a variety of receiver algorithms including, but not limited to, maximum likelihood, de-correlator, and so forth. Since the code in the reference signal indicates the spatial beam transmitted or the transmit antenna from which it is transmitted, the reference symbols can be used to identify them.

As shown in FIG. 9, at time t, a shorter OFDM CSI-RS symbol 905 is transmitted with reference symbols for four beams carried on all subcarriers and distinguished by the properties of the code transmitted as the reference symbol. The code sequence $u_1$ is transmitted in spatial beam #1 910a over all subcarriers of the shorter OFDM symbol 515 from RF chain #1 915a at time t. At the same t, using different codes $u_2$, $u_3$ and $u_4$ that have low correlation properties with code sequence $u_1$ from the other three RF chains 915b, 915c, and 915d, three different spatial beams indexed #2 910b, #3 910c and #4 910d respectively, each oriented in a different direction, and are transmitted. Due to the wireless nature of transmission, all three codes add up over the air, and arrive as a summed signal at the receiver. Using the low cross correlation property between the codes, the receiver separates the individual reference symbols and measures the channel state on each of the four spatial directions.

Figure 10:
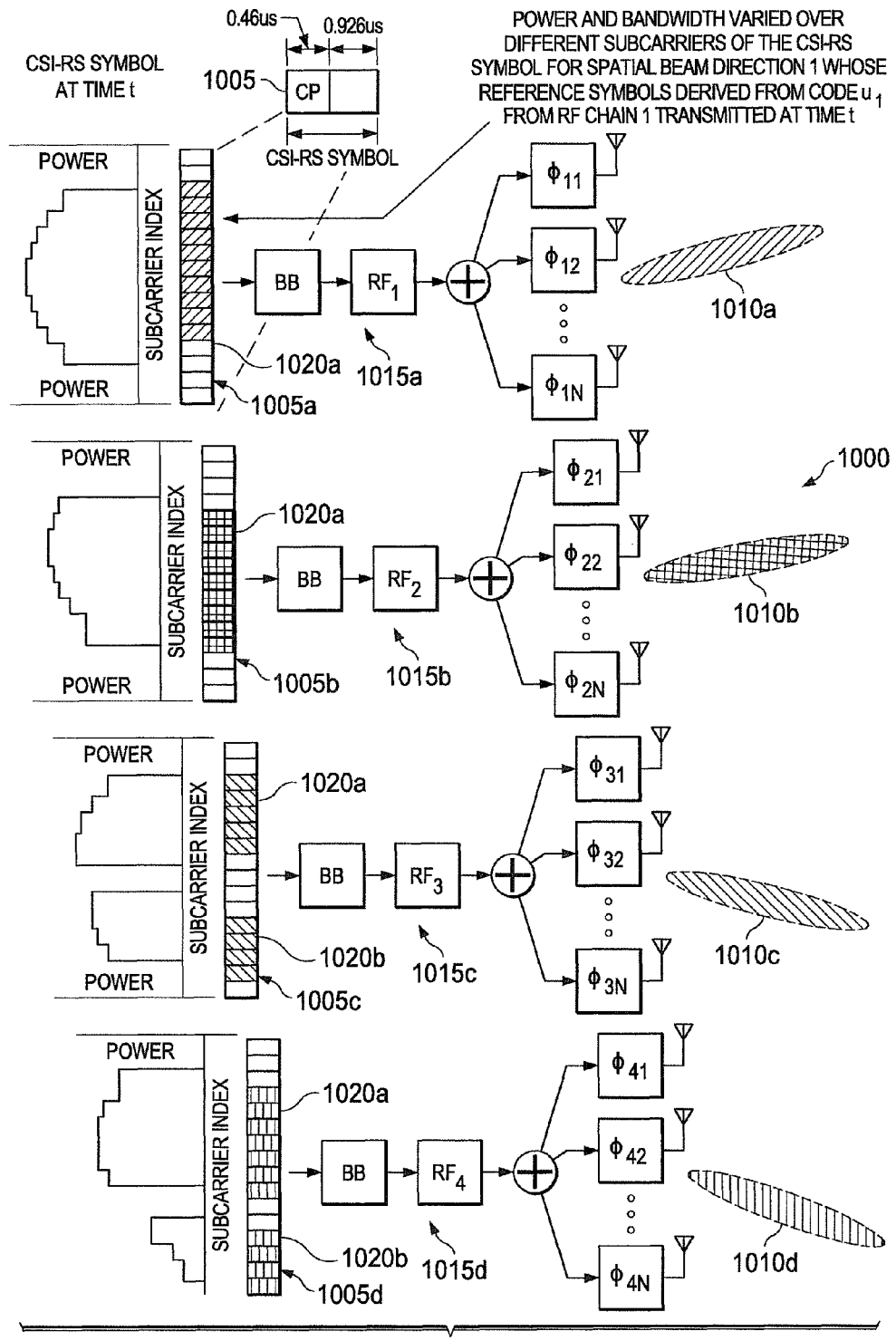
FIG. 10 illustrates a transmitter capable of varying power and bandwidth of the reference symbols according to embodiments of the present disclosure.

FIG. 10 illustrates a transmitter capable of varying power and bandwidth of the reference symbols according to embodiments of the present disclosure. The embodiment of the transmitter 1000 shown in FIG. 10 is for illustration only. Other embodiments could be used without departing from the scope of this disclosure.

Embodiment 7

Power and Bandwidth Variation for CSI-RS Reference Symbols for Shorter OFDM Symbol In certain embodiments, the reference symbols corresponding to different spatial directions or different transmit antennas are transmitted in the shorter OFDM symbol 515 so as to occupy different portions of the bandwidth with different powers. The transmitter varies the power and bandwidth to indicate the active subcarriers over which the channel must be measured to infer the channel state. The bandwidth variation is carried out by nulling subcarriers over which the reference symbols are not carried. That is, zero transmit power is allocated to those subcarriers where the reference symbols are not carried. On the subcarriers over which the reference symbols are carried, the power allocated to the subcarriers can be different. In certain embodiments, equal power is applied to all subcarriers that carry reference symbols as a special case of the unequal powers to all subcarriers that carry reference symbols. In certain embodiments, reference symbols corresponding to different spatial beams are carried on different subcarriers by adjusting power allocations to the subcarriers. Power per subcarrier can be adjusted even when the reference symbols are carried on all subcarriers in the shorter OFDM symbol 515 as shown in FIG. 9.

As shown in FIG. 10, at time t, a shorter OFDM CSI-RS symbol 1005 is transmitted with reference symbol for four beams 1010 carried on different portions of the bandwidth. The reference symbols 1005a corresponding to spatial beam direction #1 1010a is carried on a portion of the bandwidth. On those subcarriers in which the reference symbols 1005 are carried, indicated by a nonzero power allocation, they are drawn from a code $u_1$. At the same time t, the other RF chains 1015 transmit reference symbols corresponding to the spatial directions #2 1010b, #3 1010c and #4 1010d using reference symbols drawn from codes $u_2$, $u_3$ and $u_4$ respectively. These reference symbols 1005 are also carried over different portions 1020, or subsets, of the bandwidth each indicated by a shaded subcarriers. For example, the reference symbols 1005 can be carried on a subset 1020a of the subcarriers in the bandwidth. In addition, the reference symbols 1005 can be carried on a plurality of subsets 1020a and 1020b of the subcarriers in the bandwidth. The power on the subcarriers over which reference symbols are carried is altered for each of the spatial beam directions 1010 and transmitted using a different RF chain 1015.

Figure 11:
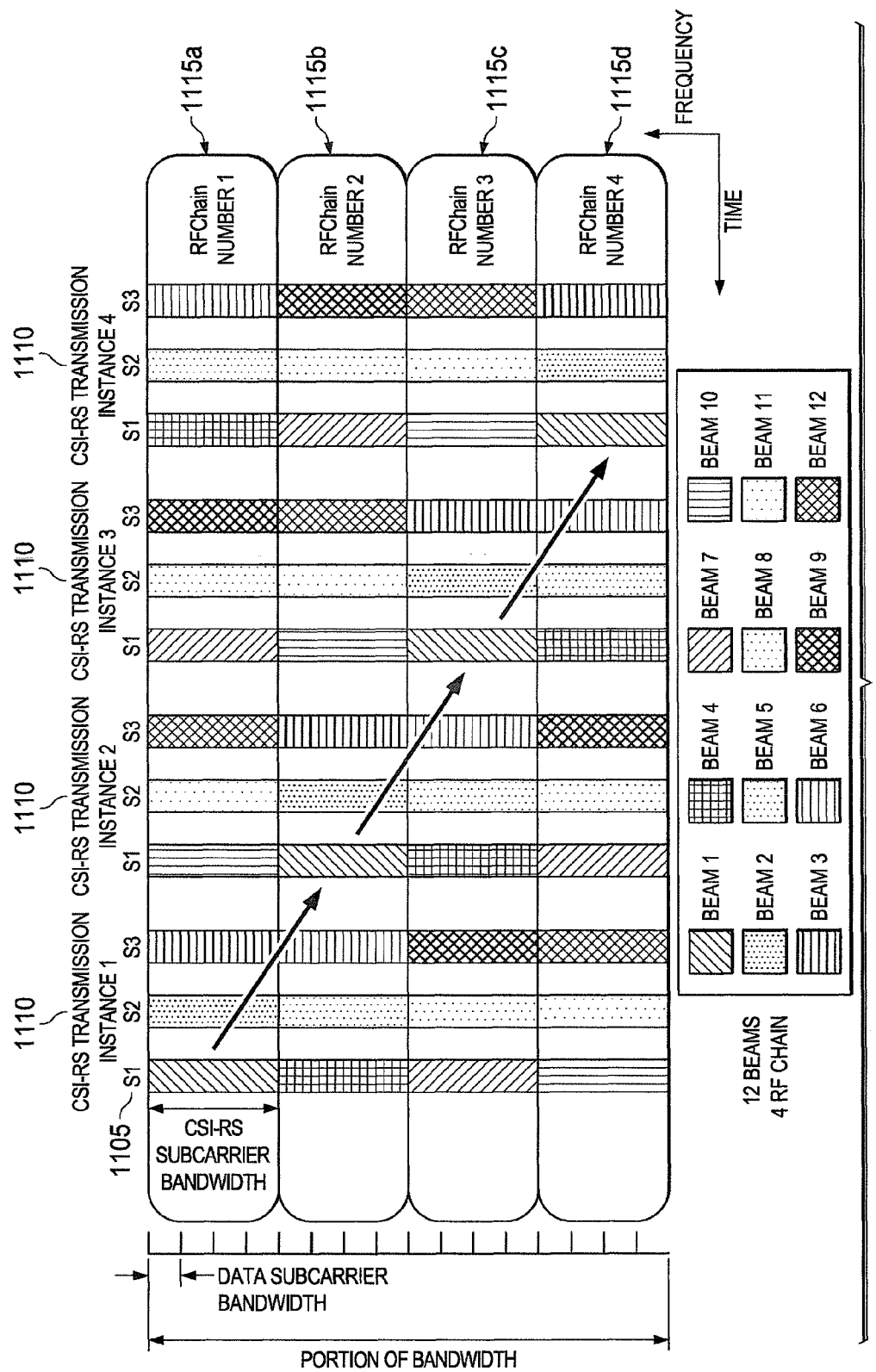
FIG. 11 illustrates a cycling of reference symbols for channel state information in shorter OFDM according to embodiments of the present disclosure.

FIG. 11 illustrates a cycling of reference symbols for channel state information in shorter orthogonal frequency division multiplexing (OFDM) according to embodiments of the present disclosure. The embodiment of the cycling of reference symbols shown in FIG. 11 is for illustration only. Other embodiments could be used without departing from the scope of this disclosure.

Embodiment 8

Frequency Cycling of CSI-RS Symbols in the Shorter OFDM Symbol

In certain embodiments, the reference symbols corresponding to a particular spatial direction or a transmit antenna are carried using different resources (e.g., power and bandwidth) of the short OFDM symbols. The use of different resources in different transmission instances is determined based on a predetermined rule. This rule takes into account the subframe number or frame number or super-frame number in determining the resources carrying the RS symbol corresponding to a spatial direction.

As shown in FIG. 11, the reference symbols corresponding to spatial beams are carried in different subcarriers in every transmission instance. A transmission instance is defined as a time duration during which one reference symbol corresponding to a specific spatial direction or a specific antenna is transmitted. A transmission instance 1110 can be separated by a slot or a sub-frame or a frame or a super-frame. It is optimized using different system and deployment parameters. The reference symbols 1105 corresponding to different spatial beams are shifted between adjacent subcarriers in every transmission instance 1110. As a specific case, consider the reference symbol 1005 corresponding to beam #1 transmitted in the first CSI-RS subcarrier 1115a of the shorter OFDM symbol in the first transmission instance 1110a. In the next transmission instance 1110b, the reference symbol 1005 is transmitted in the second CSI-RS subcarrier 1115b and in the third, the reference symbol 1005 is transmitted in the third CSI-RS subcarrier 1115c and in the fourth transmission instance, the reference symbol 1005 is transmitted on the fourth CSI-RS subcarrier 1115d. In the fifth transmission instance, the reference symbol 1005 corresponding to beam #1 is carried in the first CSI-RS subcarrier and the cycling through different subcarriers continues.

Embodiment 9

Reduced Cyclic Prefix for Shorter OFDM Symbol with Some Flooring of the CSI-RS Estimate In certain embodiments, the cyclic prefix 1205 of the shorter OFDM symbol 515 can be made smaller than the cyclic prefix 725 of the regular OFDM symbol 505. The reduced cyclic prefix 1205 of the shorter OFDM symbol 515 makes the symbol duration even smaller. This enables more CSI-RS symbols to be packed in a slot.

Figure 12:
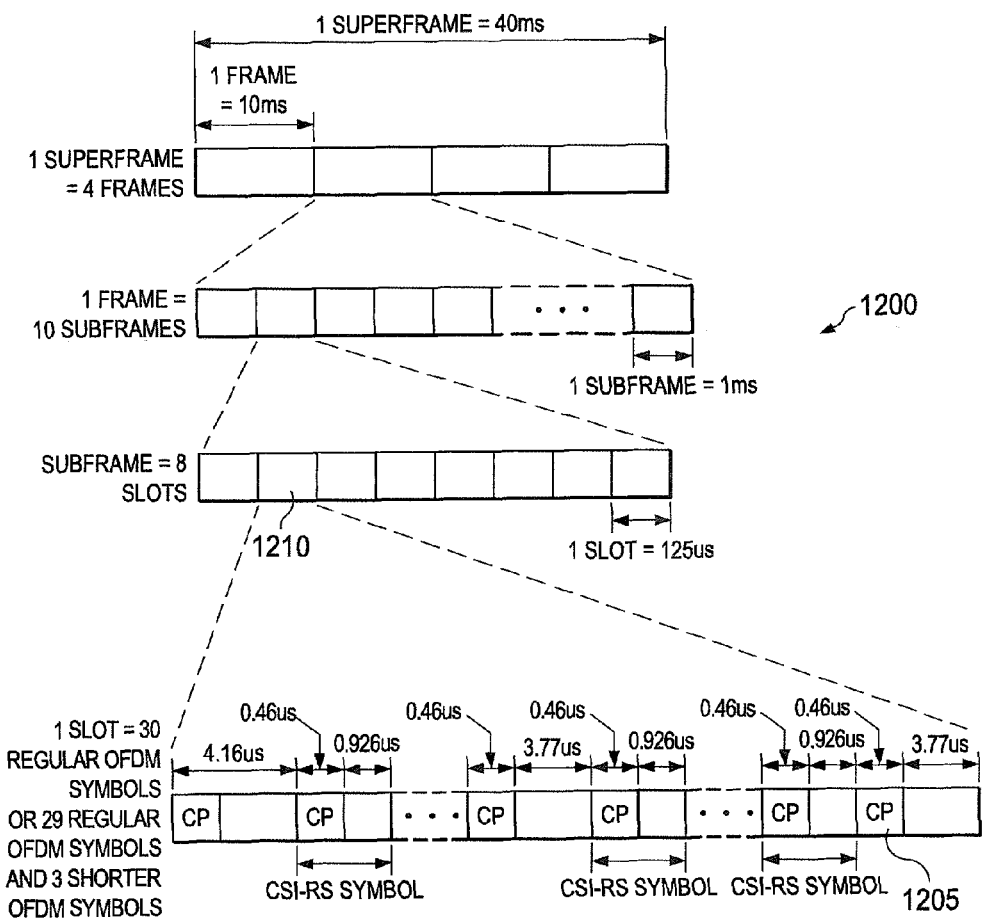
FIG. 12 illustrates a non-contiguous arrangement of shorter OFDM symbols carrying CSI-RS according to embodiments of the present disclosure.

FIG. 12 illustrates a non-contiguous arrangement of shorter OFDM symbols carrying CSI-RS according to embodiments of the present disclosure. The embodiment of the non-contiguous arrangement 1200 shown in FIG. 12 is for illustration only. Other embodiments could be used without departing from the scope of this disclosure.

Embodiment 10

Different Arrangements of Shorter OFDM Symbol in the Frame for RS Transmission

In certain embodiments, the shorter OFDM symbols 515 used to transmit CSI-RS in a slot can be placed non-contiguously—interspersed with OFDM symbols of regular duration. The numbers of shorter OFDM symbols 515 carrying the reference symbols are placed so as to fit the duration of a regular OFDM symbols 505 or an integral multiple of the regular OFDM symbol 505 duration so that the durations of a slot, sub-frame, frame and a super-frame are maintained. An example of a non-contiguous arrangement of the shorter OFDM symbols in a slot is illustrated in FIG. 12. The shorter OFDM symbol 515 is about fourth of the size of the regular OFDM symbol 505, that is, the duration of the shorter OFDM symbol 515 is 0.926 µs, which is approximately a fourth of the size of a regular OFDM symbol 505, which is 3.77 µs. When the duration of the regular cyclic prefix 725 of 0.46 µs is added to the shorter OFDM symbol 515, then only three shorter OFDM symbols 515 fit in the duration of a regular OFDM symbol 505 including the cyclic prefix 1205. A slot 1210, which otherwise would have thirty regular duration OFDM symbols 505, now has thirty-two OFDM symbols that includes twenty-nine regular OFDM symbols 505 and three shorter OFDM symbols 515. All OFDM symbols have the same cyclic prefix duration. Both the regular OFDM symbol and the shorter OFDM symbol span the same bandwidth with different subcarrier bandwidths. In the example shown in FIG. 7, the subcarrier duration of the shorter OFDM symbol 515 is four times the sub-carrier duration of the regular OFDM symbol 505 when operated at the same sampling frequency.

Embodiment 10.1

Different Arrangements of Shorter OFDM Symbol without Maintaining the Slot/Frame Boundary In certain embodiments, the shorter OFDM symbols 515 used to transmit CSI-RS in a slot can be placed non-contiguously—interspersed with OFDM symbols 505 of regular duration. The numbers of shorter OFDM symbols 515 carrying the reference symbols are determined based on the system duration and the duration of the CSI-RS symbols need not maintain the durations of a slot, sub-frame, frame and a super-frame.

Embodiment 11

Shorter OFDM Symbol RS Transmission for Training Phase of Data Transmission

In certain embodiments, the shorter OFDM symbols 515 used to transmit CSI-RS in a slot are used to estimate the channel that is used to identify the best transmission scheme for the transmitter to use to transmit to the receiver. In the case where the large array of transmit antennas is used to beam-form towards a specific spatial direction, the CSI-RS is carried for all the spatial directions the transmitter can support. Each spatial direction is identified by a beam. This beam is used to beam-form data to a given receiver. The reference symbols are carried for each of the beams that are designed to carry data. In certain embodiments, the number of distinct reference symbols then is equal to the number of beams that the transmitter supports.

Figure 13A:
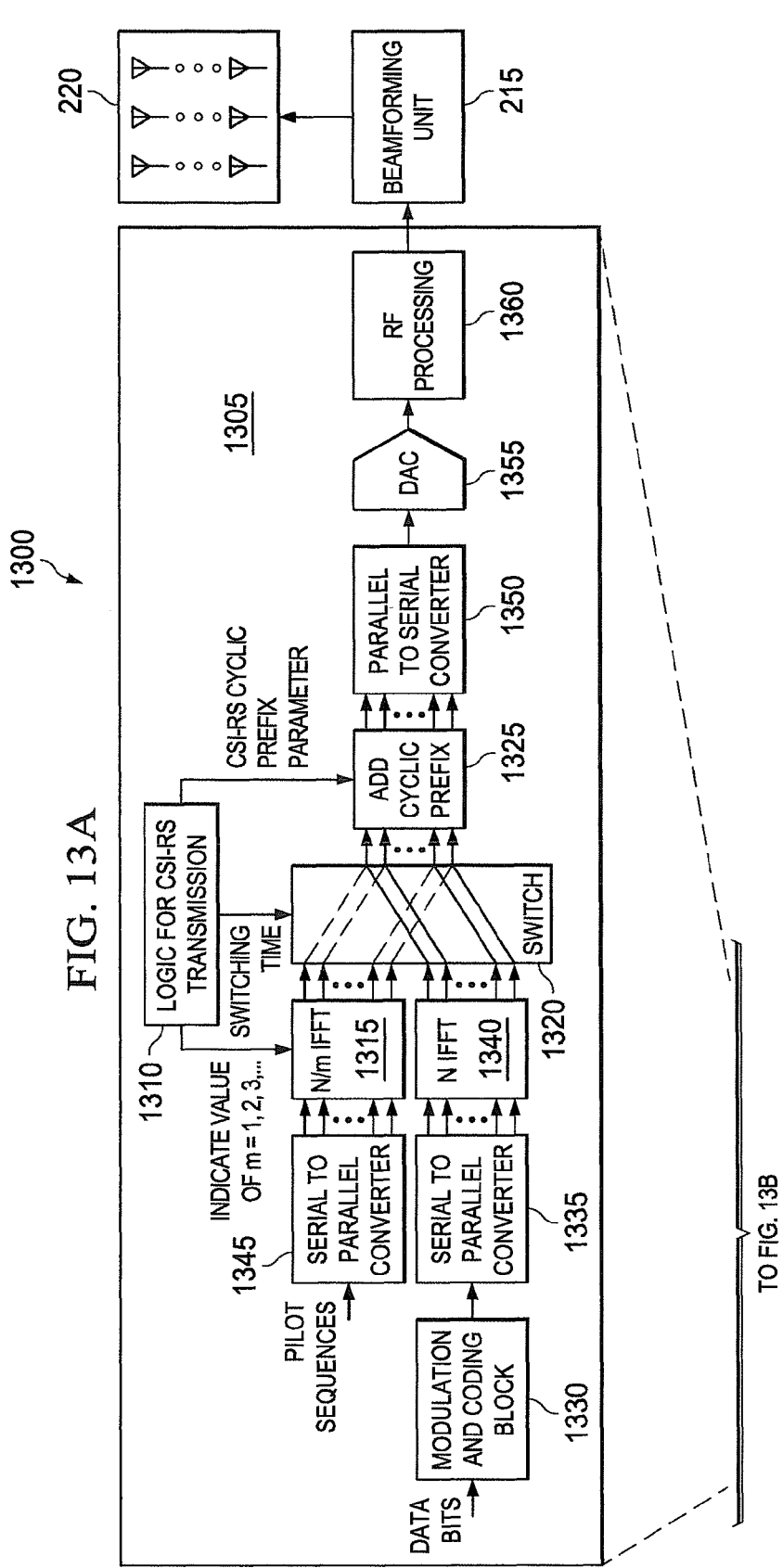
FIG. 13 illustrates a transmitter including logic for pilot multiplexing according to embodiments of the present disclosure.
Figure 13B:
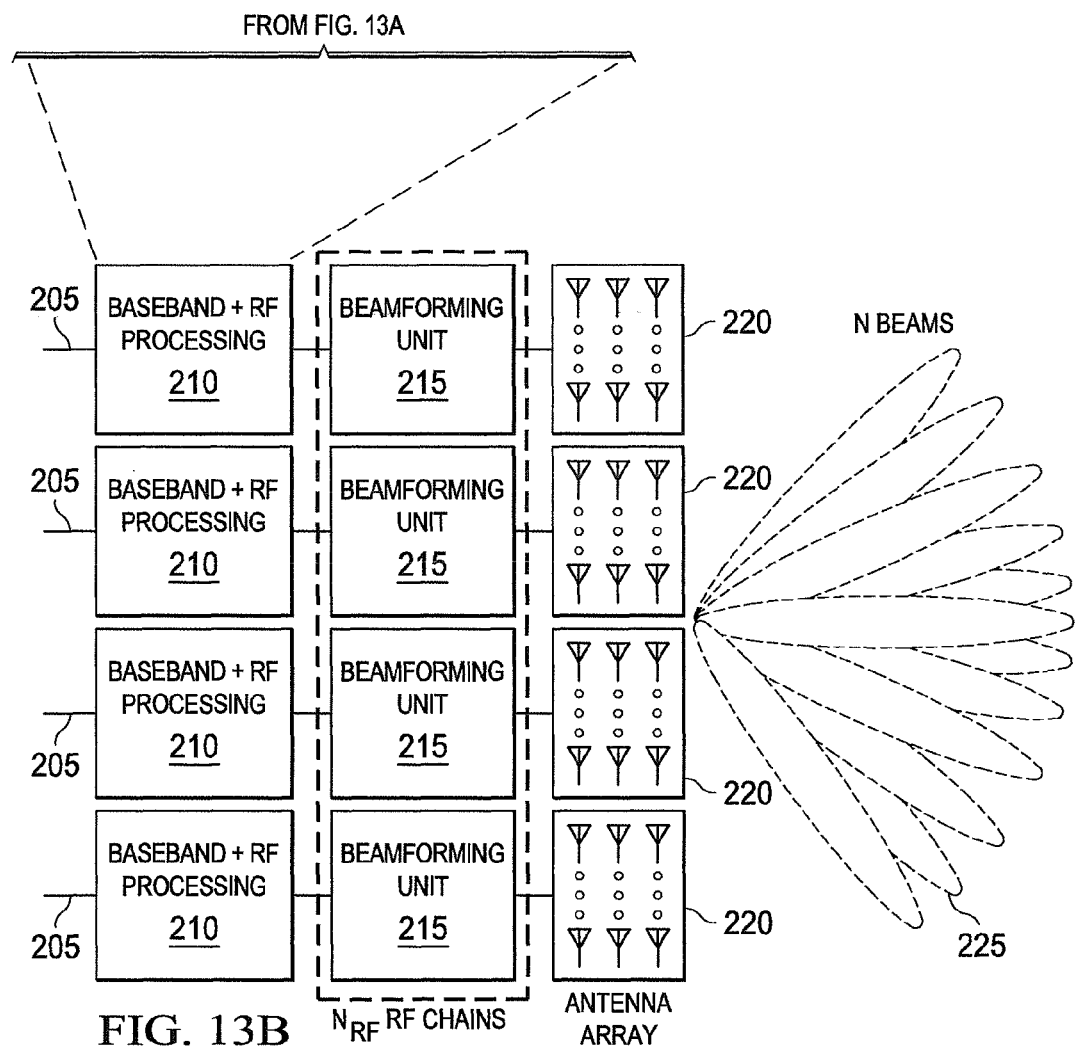

FIG. 13 illustrates a transmitter including logic for pilot multiplexing according to embodiments of the present disclosure. The embodiment of the transmitter 1300 shown in FIG. 13 is for illustration only. Other embodiments could be used without departing from the scope of this disclosure.

The transmitter 1300 can include the same or similar functionality as shown in the base station 200. In addition, BS 200 can include transmitter 1300. Each baseband +RF Processing block 210 includes a transmit path 1305 coupled to the respective beamforming unit 215. The transmit path 1305 includes CSI-RS transmission logic 1310 coupled to an N/m IFFT block 1315, switch 1320 and cyclic prefix block 1325. The transmit path 1305 also includes a modulation and coding block 1330 configured to receive data bits from the source and coupled to a serial to parallel converter 1335 and N IFFT block 1340. The transmit path 1305 further includes a second serial to parallel converter 1345 configured to receive pilot sequences and coupled to the N/m IFFT block 1315. The cyclic prefix block 1325 is coupled to a parallel to serial converter 1350, digital to analog converter (DAC) 1355 and RF processing unit 1360.

Embodiment 12

Controlling Logic Different Sizes for Reduced Symbol Period CSI-RS Symbols

In certain embodiments, the size of the CSI-RS symbols is flexible and is determined by a CSI-RS transmission logic 1310 at the time of its transmission. The CSI-RS transmission logic 1310 determines both the size of the IFFT used for CSI-RS symbols as well as the switching time for multiplexing CSI-RS symbols. At the time of CSI-RS transmission, the CSI-RS transmission logic 1310 indicates the size of IFFT to be used to transmit CSI-RS symbols, operates switch 1320, multiplexes the pilot sequences for further processing in the transceiver chain, and sets the CSI-RS cyclic prefix parameter that indicates the size of the Cyclic Prefix 1325 in the CSI-RS symbol. The CSI-RS transmission logic 1310 determines the size of the CSI-RS OFDM symbol; the size of the CSI-RS OFDM symbols is indicated to the receiver by signaling or is implicit depending on the time instance of CSI-RS transmission.

Figure 14:
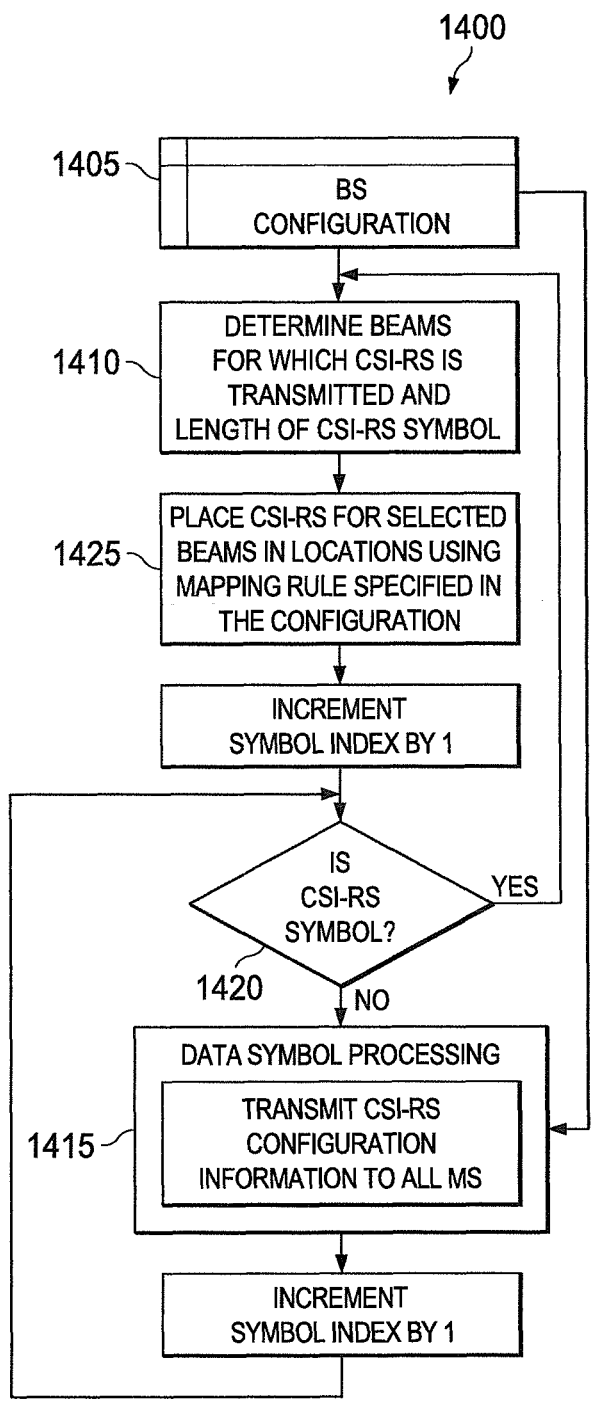
FIG. 14 illustrates a process of transmitting CSI-RS symbols at a base station according to embodiments of the present disclosure.

FIG. 14 illustrates a process of transmitting CSI-RS symbols at a base station according to embodiments of the present disclosure. The process 1400 shown in FIG. 14 details the processing logic for CSI-RS transmission. The configuration 1405 for the BS 200 (coverage area) that includes CSI-RS configurations is stored in memory. In block 1410, the processing logic 1310 at the BS 200 reads the memory to determine the configuration for CSI-RS. More than one configuration can exist for the CSI-RS, in which case the logic is set to pick one of the configuration options. The BS 200 transmits the CSI-RS configuration to the MS in a message in block 1415. This message is broadcast using one or more of: a broadcast control channel, multicast control channel or a unicast control channel. The configuration is used by the MS to determine the property of the CSI-RS symbol, beam indices for which the CSI-RS are transmitted in the said CSI-RS symbol as well as the length of the CSI-RS symbol in block 1420. The mapping is performed as per the rule between the number of beam directions transmitted in one OFDM symbol and the CSI-RS symbol are created in block 1425. This rule either is a single rule agreed à priori between the transmitter and the receiver or can be adapted and explicitly signaled using a configuration message to the receiver. Using the configuration, the BS assembles and transmits the CSI-RS OFDM symbol corresponding to the chosen beam directions. This logic is performed until the CSI-RS transmission corresponding to all supported beam directions are transmitted.

Figure 15:
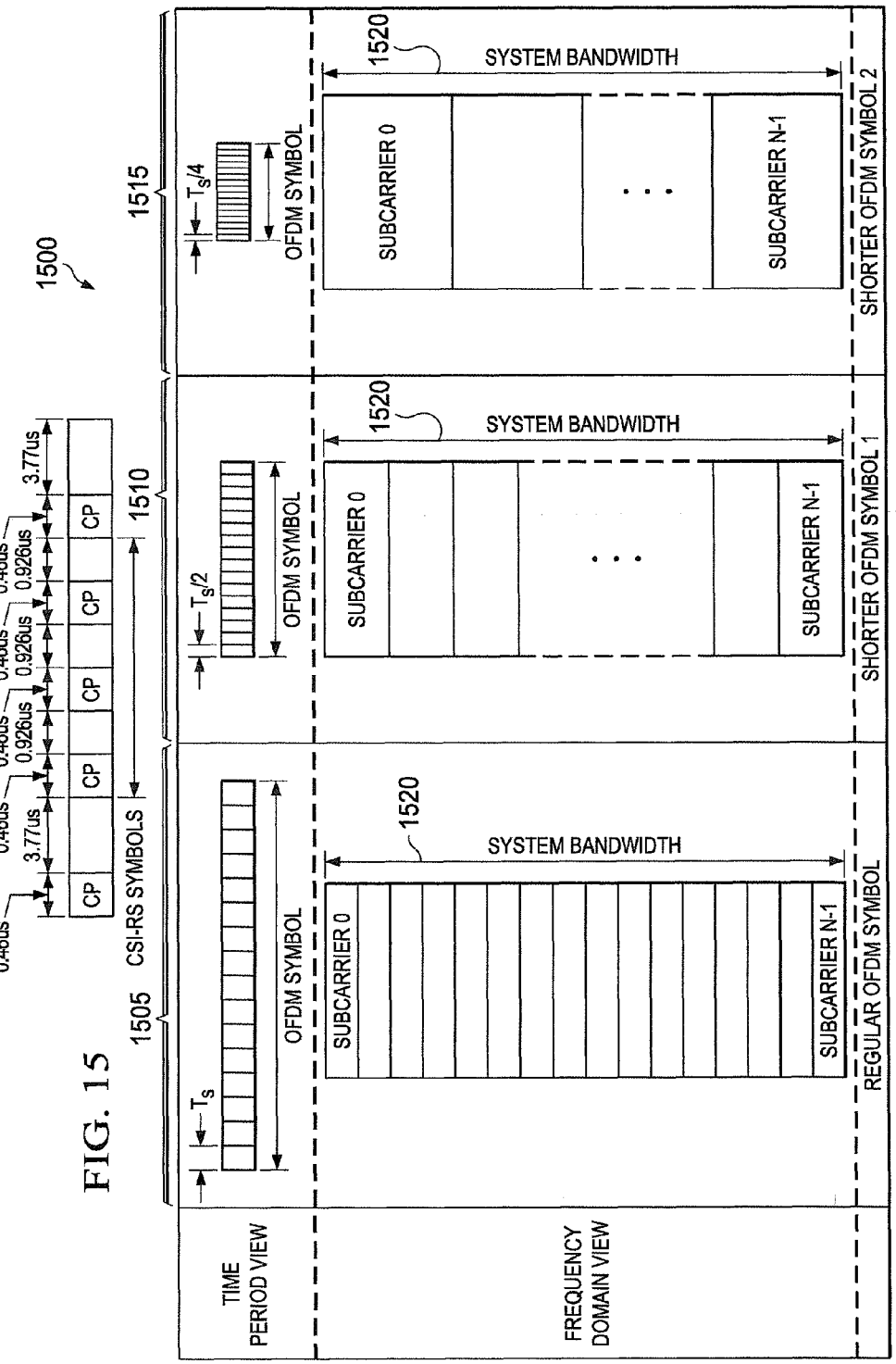
FIG. 15 illustrates shortening an OFDM symbol by increasing a sampling frequency according to embodiments of the present disclosure.

FIG. 15 illustrates shortening an OFDM symbol by increasing a sampling frequency according to embodiments of the present disclosure. The embodiment of the short OFDM symbol 1500 shown in FIG. 15 is for illustration only. Other embodiments could be used without departing from the scope of this disclosure.

Embodiment 13

Reduced Symbol Period by Increasing Sampling Frequency for CSI RS Transmission

In certain embodiments, the duration of the OFDM symbol that carries reference symbols is reduced by using a different and higher sampling frequency than that used for the OFDM symbol carrying data transmission. The OFDM symbol for reference symbols has the same number of subcarriers as the regular OFDM symbols 1505 used for data transmission. If the sampling frequency is increased, the OFDM symbols 1510, 1515 used for transmitting reference symbols are of shorter duration than the regular OFDM symbols 1505 used for data transmission and will henceforth be referred to as shorter OFDM symbols. The subcarriers of the shorter OFDM symbols 1510, 1515 and those of the regular OFDM symbols span the same bandwidth 1520. For the purpose of this embodiment, a shorter OFDM symbol 1510 is derived by using a higher sampling frequency than the one used for a regular OFDM symbol 1505 used for data transmission. A direct effect of reducing the time period in the shorter OFDM symbols 1505 is the increased subcarrier bandwidth. By the sampling frequency, the OFDM symbol 1510 duration is reduced by half, if the sampling period $T_s$ is halved (or equivalently the sampling frequency $F_s=1/T_s$ doubled). In addition, by reducing the sampling period to a quarter ($T_s/4$), the OFDM symbol 1515 duration is reduced to a quarter. The two examples for shorter symbol are only exemplary in nature and any factor for increasing the sampling frequency can be used for the shorter OFDM symbol.

Embodiment 14

User Location Based Symbol Period Reduction for CSI-RS Transmission

In certain embodiments, the CSI-RS transmitted for a specific spatial beam direction can be chosen based on receiver location in the cell. This allows for opportunistically training for only those spatial beams that will be useful for carrying the data based on the receiver location. For example, users far away from the cell center can use a subset of supported beams whose beam-widths are wider. In a situation where a lot of users prefer the wider beams, then those beams can be transmitted more frequently in preference to the beams that have not been preferred by the users.

Embodiment 15

User Mobility Based Adaptive CSI-RS Transmission

In certain embodiments, CSI-RS transmission is adaptive based on user mobility.

The beam width of the spatial beam is adapted based on receiver's mobility. Therefore, the CSI-RS carried over the beam that has a beam width that can be adapted. The beam for a lower mobility user can be narrower, and the CSI-RS can be over a narrower beam. The beam for a high mobility user can be wider and the CSI-RS can be over a wider beam. For example, in a cell if all the users are almost stationary or with very low mobility, the CSI-RS can be over a narrow beam.

In certain embodiments, the length of the OFDM symbol carrying the CSI-RS is also based on the user mobility. For example, in a cell if all the users are almost stationary or with very low mobility, the CSI-RS can use a long symbol. If all users are with moderate or high speed, a shorter symbol for CSI-RS can be used. The technology in these embodiments can be combined with user location based adaptive CSI-RS transmission.

Embodiment 16

Codebook Based Multiplexing of CSI-RS

In certain embodiments, the CSI-RS corresponding to different codebooks is transmitted using shorter OFDM symbols at different transmission instances of the shorter OFDM symbols. The different codebooks could correspond to multi-resolution beams where each codebook corresponds to different beam widths. The CSI-RS corresponding to different beams of a given codebook are transmitted in one transmission instance of the shorter OFDM symbol based CSI-RS transmission. At the next transmission instance, the CSI-RS corresponding to beams from a different codebook are transmitted. Once CSI-RS corresponding to beams from all codebooks are transmitted, the transmission sequence of the beams for all codebooks is repeated in the subsequent transmission instances of the CSI-RS. For example, if there are N codebooks each with $B_i$ beams, i=1, 2, . . . , N, the first transmission instance of the CSI-RS will involve transmitting CSI-RS corresponding to the beams in codebook $B_1$. In the second transmission instance of CSI-RS, the CSI-RS corresponding to beams in codebook $B_2$, and in the $N^{th}$ transmission instance of the CSI-RS, the CSI-RS corresponding to beams in codebook $B_N$ will be transmitted. At the $N+1^{th}$ transmission instance, the CSI-RS transmission for beams in codebook $B_1$ is transmitted and the transmission cycle repeats. The multi-resolution codebooks are presented as an example and any other multi-codebook based beamforming can be supported by time multiplexing CSI-RS shorter OFDM symbols corresponding to the codebooks.

Embodiment 17

Codebook Based Multiplexing of CSI-RS with Different Transmission Frequency

In certain embodiments, the CSI-RS corresponding to different codebooks is transmitted using shorter OFDM symbols at different transmission instances of the shorter OFDM symbols. The frequency of transmission of the CSI-RS symbols corresponding to a particular codebook can be set independently for each codebook. For example, if there are N codebooks each with $B_i$ beams, i=1, 2, . . . , N, a codebook $B_j$ can be transmitted $M_j$ times while a codebook $B_k$ may be transmitted $M_k$ times, j≠k; j, k=1, 2, . . . N. The CSI-RS corresponding to beams from a particular codebook is transmitted as many times as is specified and only after all the CSI-RS corresponding to all codebooks are transmitted does a new transmission cycle begins. The frequency of transmission for each codebook can be determined based on codebook usage statistics or based on required performance or any other metric. The metric for determining transmission frequency is outside the scope of this invention.

Embodiment 17.1

Dynamic Different Transmission Frequency for Different Codebooks

In certain embodiments, the CSI-RS corresponding to different codebooks is transmitted using shorter OFDM symbols at different transmission instances of the shorter OFDM symbols. The frequency of transmission of the CSI-RS symbols corresponding to a particular codebook can be set independently for each codebook. This frequency of transmission can be dynamically determined. For example, in the first cycle of transmission, the CSI-RS corresponding to different codebooks can be transmitted once in a transmission cycle. Based on received feedback from users, the BS may determine some of the codebooks may be transmitted more frequently than the others and in the subsequent transmission cycles, this new transmission frequency for codebooks will be used in transmitting the CSI-RS symbols.

Embodiment 18

Different Symbol Lengths for Multiplexing Different Codebooks

In certain embodiments, the CSI-RS corresponding to different codebooks is transmitted on shorter OFDM symbols with different lengths. For example, the CSI-RS corresponding to the codebook with the widest beam widths is transmitted using an regular OFDM symbol using an N point FFT, the CSI-RS corresponding to the narrowest codebook is transmitted using an shorter OFDM symbol using an N/8 point FFT, the shorter OFDM symbols with N/4, N/2 FFT is used to transmit CSI-RS symbols corresponding to codebooks with beam widths between the widest and the narrowest beam widths supported. Thus CSI-RS for multi-beam resolution codebook is supported using OFDM symbols with different symbol periods.

Embodiment 19

Signaling for CSI-RS Symbol Length from BS to MS

In certain embodiments, the symbol length of the CSI-RS symbol is indicated to the mobile station from the base station using a configuration message. The length of the CSI-RS symbol is indicated by a string of bits in a specified position of the configuration message.

Figure 16:
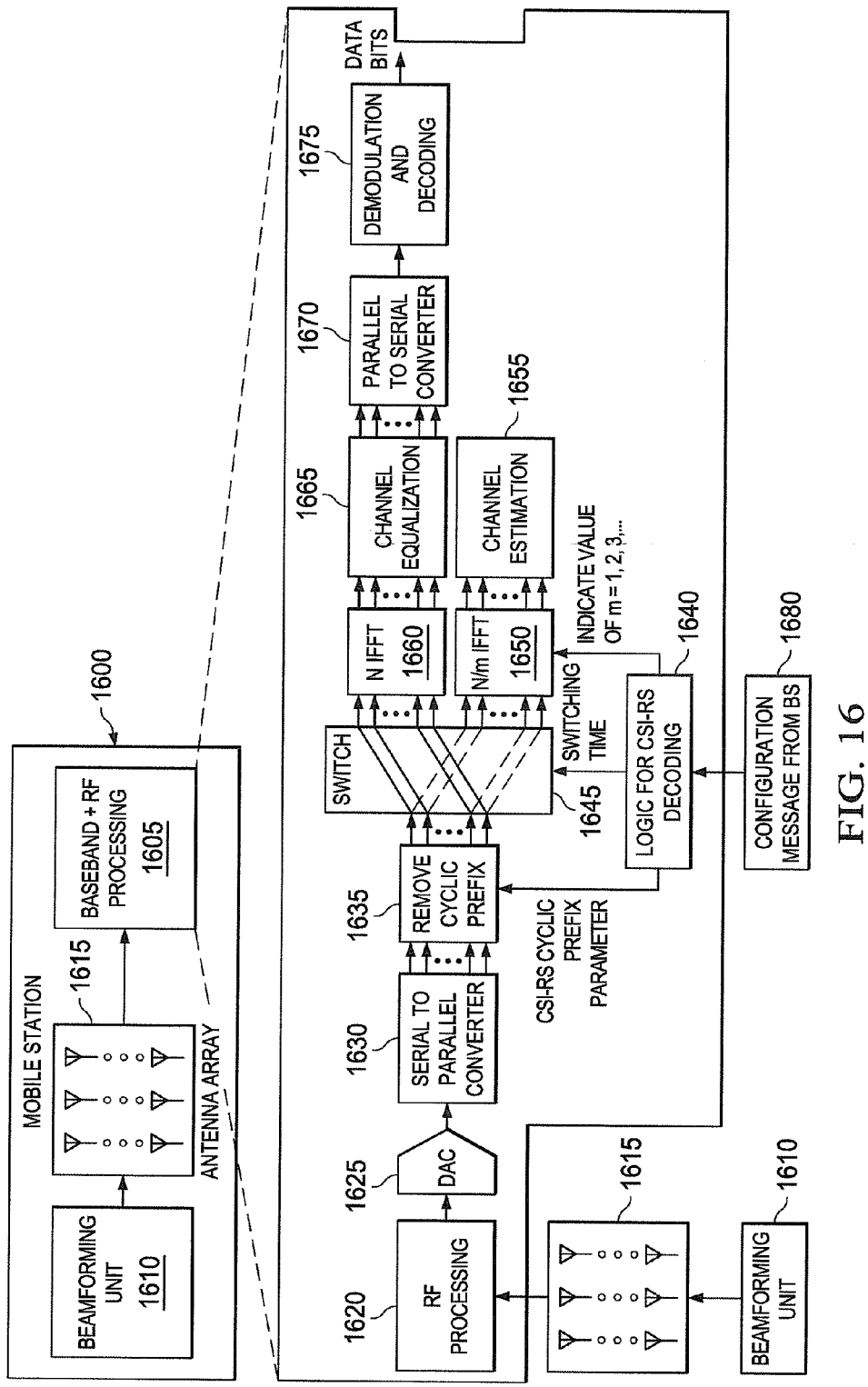
FIG. 16 illustrates a mobile station according to embodiments of the present disclosure.

FIG. 16 illustrates a mobile station (MS) according to embodiments of the present disclosure. The embodiment of the mobile station 1600 shown in FIG. 16 is for illustration only. Other embodiments could be used without departing from the scope of this disclosure. The mobile station 1600 includes a Baseband +RF Processing block 1605, a beamforming unit 1610 and an antenna array 1615. The Baseband +RF Processing block 1605 includes an RF processing block 1620 coupled to a DAC 1625, serial to parallel converter 1630 and remove cyclic prefix block 1635. A logic for CSI-RS decoding 1640 is coupled to the remove cyclic prefix block 1635, switch 1645 and N/m FFT 1650. The logic for CSI-RS decoding 1640 is configured to indicate a value of "m" for the N/m FFT 1650. For example, the logic for CSI-RS decoding 1640 indicates m=1, 2, 3 . . . and so forth. The N/m FFT 1650 is coupled to channel estimation block 1655. The switch is configured to alter connection of the remove cyclic prefix block 1635 between the N/m FFT 1650 and N FFT 1660. The N FFT 1660 is coupled to another channel estimation block 1665, parallel to serial converter 1670 and demodulation and decoding block 1675, which outputs data bits.

The position and configuration of the CSI symbols can be based on a single rule and need not be explicitly signaled between the transmitter and the receiver. In case there are many configurations possible to accommodate different rules, then this configuration will have to be explicitly signaled using a configuration message to the receiver. The position of CSI-RS in a slot or sub-frame and the frequency of the CSI-RS transmission are indicated using more fields of the configuration message 1680. The MS 1600 upon decoding the configuration message 1680 identifies the length of the CSI-RS symbol and its position in the sub-frame and slot. The MS 1600 decodes the configuration message 1680 to set its switching logic, which sets the parameters in the remove cyclic prefix 1635, CSI-RS switch 1645 and the FFT size blocks of the receiver chain. The configuration message 1680 exchange between the BS 200 and MS 1600 begins with configuration message 1680 from the base station 200 transmitted to the mobile station 1600, which includes CSI-RS specific parameters. The MS 1600 decodes the configuration message 1680 and sets the CSI-RS decoding logic 1640. The CSI-RS is received from the BS 200. The MS 1600 uses the CSI-RS to estimate the channel quality and the preferred beam index for data reception. The MS 1600 transmits the channel quality indication along with the preferred beam index to the BS 200 using an uplink feedback channel. The BS 200 uses the feedback received from the MS 1600 in deciding the strategy for data transmission.

Figure 17:
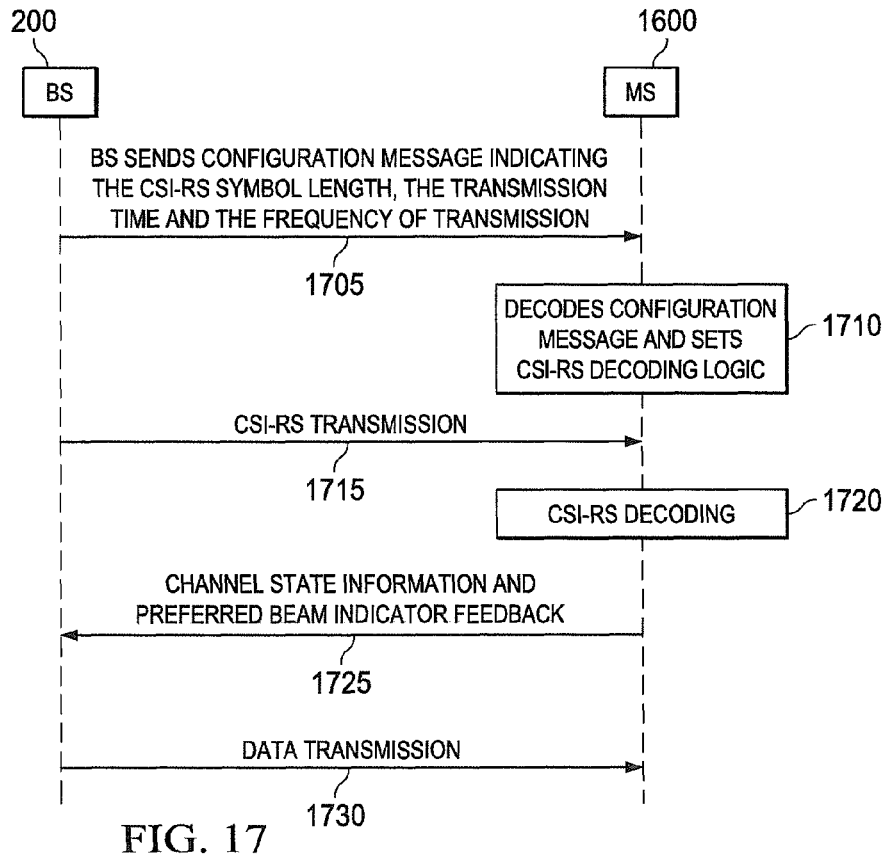
FIG. 17 illustrates signaling between a base station and mobile station according to embodiments of the present disclosure.

FIG. 17 illustrates signaling between a base station and mobile station according to embodiments of the present disclosure. In step 1705, BS 200 sends the configuration message 1680 to MS 1600. The configuration message 1680 indicates the CSI-RS symbol length, the transmission time and the frequency of transmission. In step 1710, MS 1600 decodes the configuration message 1680 and sets CSI-RS logic 1640. In step 1715, the BS 200 conducts a CSI-RS transmission. MS 1600 decodes the CSI-RS transmission in step 1720. In response, in step 1725, MS 1600 transmits channel state information and a preferred beam indicator via a feedback channel. In step 1730, BS 200 conducts a data transmission.

TABLE 1 includes an example of different fields for CSI-RS configuration in the configuration message 1680 transmitted from the BS.

TABLE 1

| Attribute/Array of Attributes | Size (bits) | Value/Notes | Conditions |
|---|---|---|---|
| CSI-RS Symbol length | 3 | 0x000->m = 1; 0x001-> m = 4; 0x011->m = 8; 0x100-0x111- reserved | |
| Number of spatial beams supported | variable | Depends upon the codebook used | |
| Number of CSI-RS symbols | Variable | Depends upon the codebook used | |
| CSI-RS sub-frame index | 4 | Last 4 LSBs of the subframe index in which the CSI-RS is first transmitted | |
| CSI-RS transmission frequency | 4 | Frequency in units of subframes of CSI-RS transmission | |

For example, if the system has twelve (12) supportable beam directions, then the configuration message 1680 uses four bits to indicate that twelve beam directions are supported. The number of CSI-RS symbols field indicates the total OFDM symbols in a sub-frame dedicated to CSI-RS transmission. If BS 200 is configured to use three OFDM symbols, then the field for number of CSI-RS symbols uses three bits to indicate that three OFDM symbols are used. For each configuration of the number of spatial beams supported and the number of CSI-RS symbols used, the location of the CSI-RS symbols, the placement of CSI-RS in those symbols and the mapping of the beams with the CSI-RS symbols are implicitly specified. The configuration details are stored in the memory of both BS 200 and MS 1600 and used by the CSI-RS processing logic 1320, 1640. With these parameters, MS 600 determines the CSI-RS transmission mode and decodes the CSI-RS symbols as shown in FIG. 18.

Figure 18:
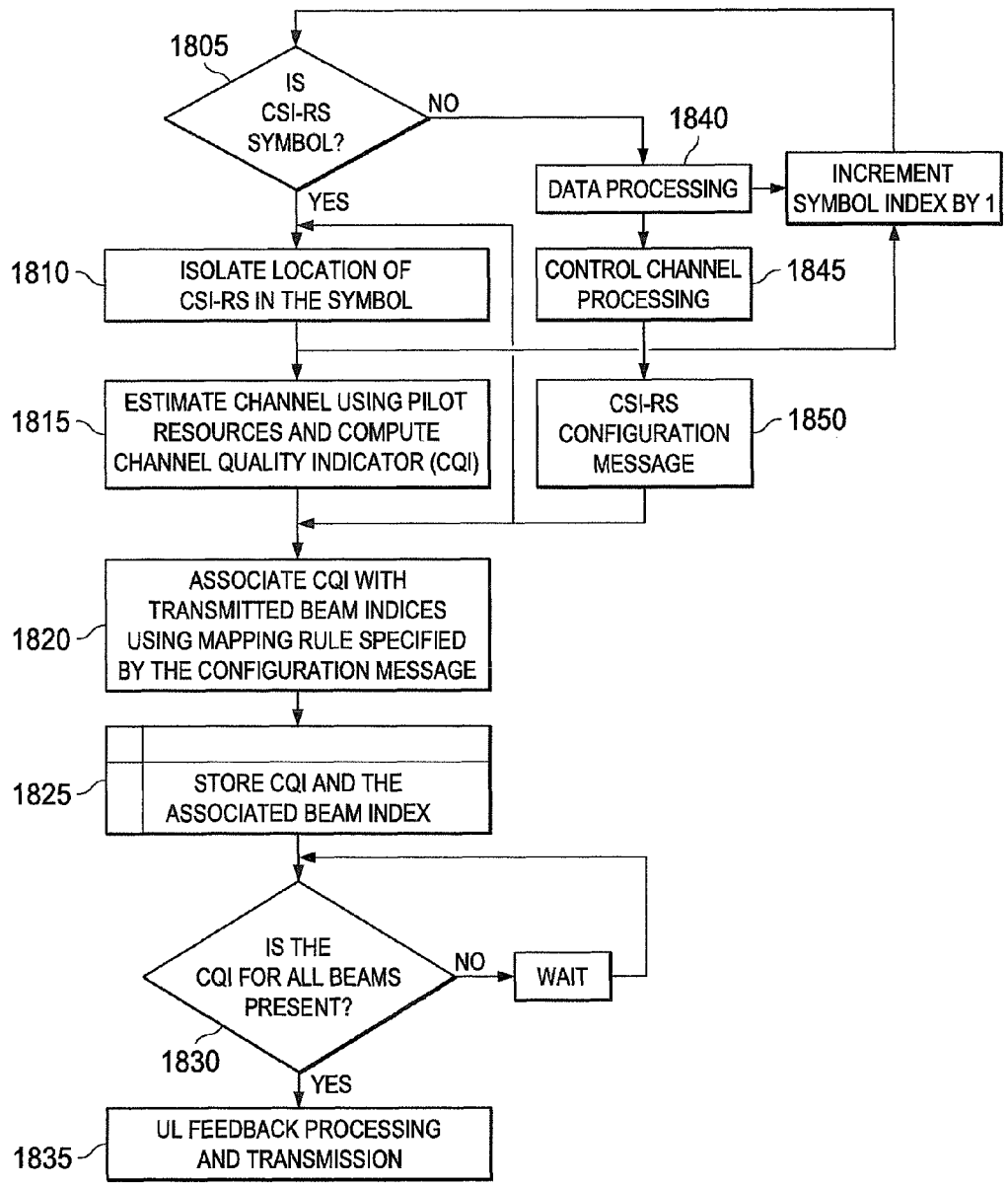
FIG. 18 illustrates a process for CSI-RS processing by a mobile station according to embodiments of the present disclosure.

FIG. 18 illustrates a process for CSI-RS processing by a mobile station according to embodiments of the present disclosure. If MS 600 determines that if the OFDM symbol corresponding to the current symbol number is a CSI-RS symbol in block 1805, in step 1810, MS 1600 uses the configuration message 1680 to construct logic to isolate the sub-carriers carrying the CSI-RS in the symbol. MS 1600 uses the CSI-RS symbols for channel estimation in block 1815, which is in turn used to compute the channel quality indicator (CQI). In block 1820, the mapping rule specified in the CSI-RS configuration, in block 1825, is used to associate the CQI with the index of the spatial beam used in transmission of the CSI-RS. Once CQI for all the supported spatial directions are received, in block 1830, MS 1600 uses the uplink feedback channel to indicate the current CQI and the preferred beam(s) to BS 200 in block 1835. When it is determined that the current OFDM symbol is not a CSI-RS symbol, MS 1600 processes the data in block 1840, performs control channel processing in block 1845 and extracts that CSI-RS configuration message 1640 in block 1850.

Embodiment 20

Signaling for CSI-RS Configuration from MS 1600 to BS 200

In certain embodiments, the size of the CSI-RS symbol is indicated by MS 1600 using a feedback message to the base station. MS 1600 uses one or more of: its speed, location and other parameters to determine the optimum configuration for the CSI-RS reception from BS 200. This configuration is transmitted to the BS 200. BS 200 aggregates the feedbacks received from MS 1600, and other MS's under its purview, and determines the best configuration that supports robust channel quality estimation at all MS 1600, and other MS's under its purview.

Embodiments of the present disclosure include a system that uses antenna arrays to form directional beams. The transmitter transmits using one of the numerous directional beams that provides the maximum power gain called the transmit beamforming gain at the receiver. The receiver also uses a direction beam generated by using appropriate weights applied to the antenna array to receive the signal transmitted by the transmitter. The power gain at the receiver is called the receive beamforming gain. The directional beams are generated by applying appropriate weights to the signal sent/received at the individual antennas of the antenna arrays. The weights correspond to a beam formed in a specified spatial direction. Two parameters define the directional beam produced by an antenna array: the angle of the directional beam measured with respect to the plane in which the antennas are arranged and the width of the directional beam called the beam width determined by the weights and the number of antennas in the array. Although a focus is placed on planar arrays in this disclosure, techniques described in this disclosure are applicable to non-planar antenna arrays.

In downlink, BS 200 transmits data to MS 1600 using transmit beamforming while MS 1600 receives the data from BS 200 using the receive beamforming. On the uplink, this relation is reversed where MS 1600 transmits using spatial beams and BS 200 receives the data using receive beamforming. The channel between BS 200 and MS 1600 on the downlink can be represented by a sum of discrete ray paths:

$$C(\theta, \phi) = \sum_{\{k=1\}}^{\{K\}} \beta_k e^{\{j\psi_k\}} \delta(\phi - \Phi_k, \theta - \Theta_k)$$

where $\Phi_k$ and $\Theta_k$ are the departure and arrival angles respectively for the $k^{\{th\}}$ ray in the channel from the transmit to the receive array. The values $\Phi_k$, $\Theta_k$, $\beta_k$ and $\psi_k$ are random variables that are modeled with known distributions.

Figure 19:
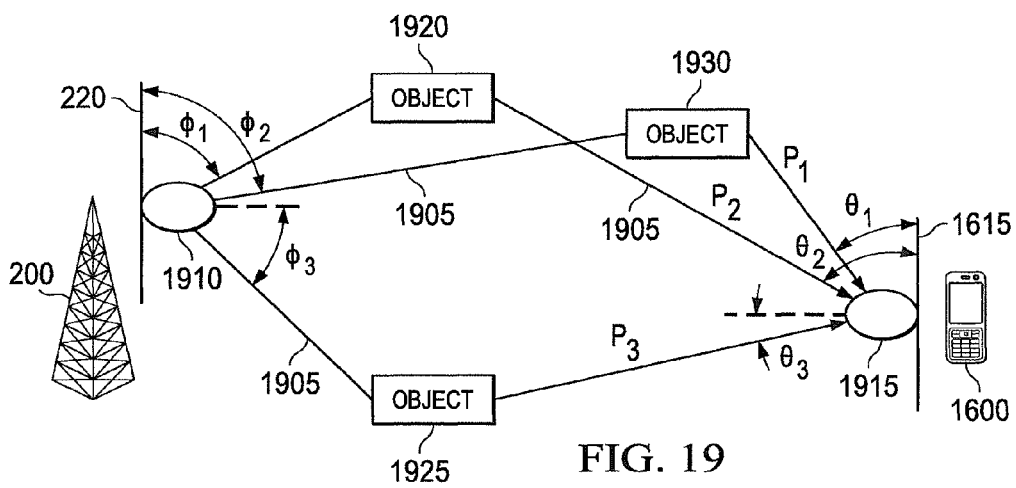
FIG. 19 illustrates a multipath channel from a base station to a mobile station according to embodiments of the present disclosure.

FIG. 19 illustrates a multipath channel from a base station to a mobile station according to embodiments of the present disclosure. The embodiment of the multipath channel shown in FIG. 19 is for illustration only. Other embodiments could be used without departing from the scope of this disclosure.

The channel between base station 200 and mobile station 1600 is identified by a three path channel 1905 each with a specific angle of departure $\Phi_k$ and a specific angle of arrival $\Theta_k$. The antenna array 220 at BS 200 forms a spatial beam 1910 while the antenna array 1615 at MS 1600 forms a spatial beam 1915. In the absence of a direct path to MS 1600, the transmitted electromagnetic wave is reflected at least once by objects 1920, 1925 and 1930 before it reaches the receiver.

In certain embodiments, BS 200 transmits one set of reference symbols using beams with directions $\{\phi_1^{(0)}, \phi_2^{(0)}, \ldots \phi_N^{(0)}\}$ in one instance of transmission, $\{\phi_1^{(1)}, \phi_2^{(1)}, \ldots \phi_N^{(1)}\}$ in another instance of the transmission, where $\phi_i^{(1)} = \phi_i^{(0)} + \epsilon_1$, $\{\phi_1^{(2)}, \phi_2^{(2)}, \ldots \phi_N^{(2)}\}$ and in another instance of transmission where $\phi_i^{(2)} = \phi_i^{(1)} + \epsilon_2$ until p transmission instances of the reference symbols are transmitted.

Figure 20:
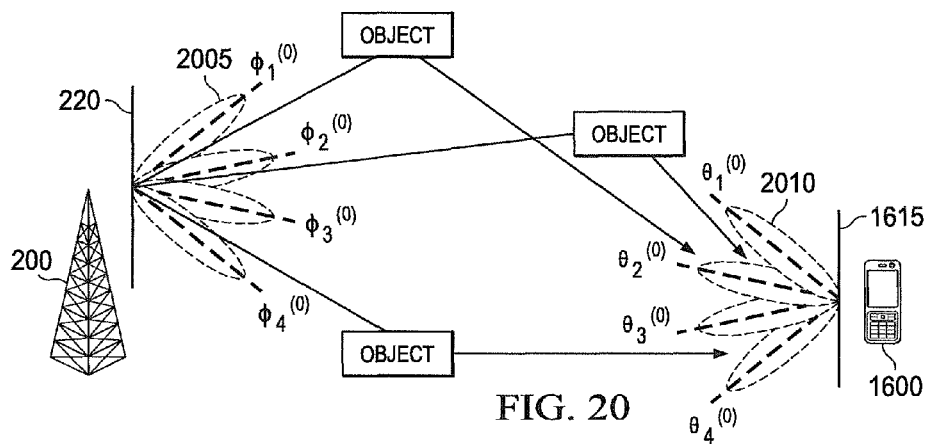
FIG. 20 illustrates a first instance of transmission of the reference directions using reference symbols according to embodiments of the present disclosure.

FIG. 20 illustrates a first instance of transmission of the reference directions using reference symbols according to embodiments of the present disclosure. The embodiment of the first instance of the transmission shown in FIG. 20 is for illustration only. Other embodiments could be used without departing from the scope of this disclosure.

Figure 21:
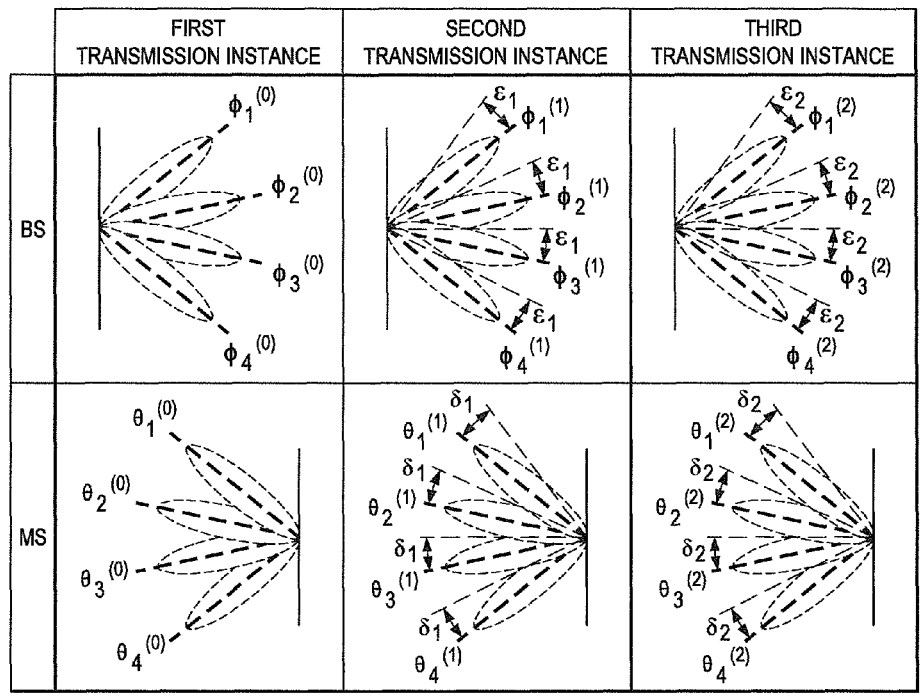
FIG. 21 illustrates beams of the different spatially staggered reference symbols at the base station and mobile station according to embodiments of the present disclosure.
Figure 22:
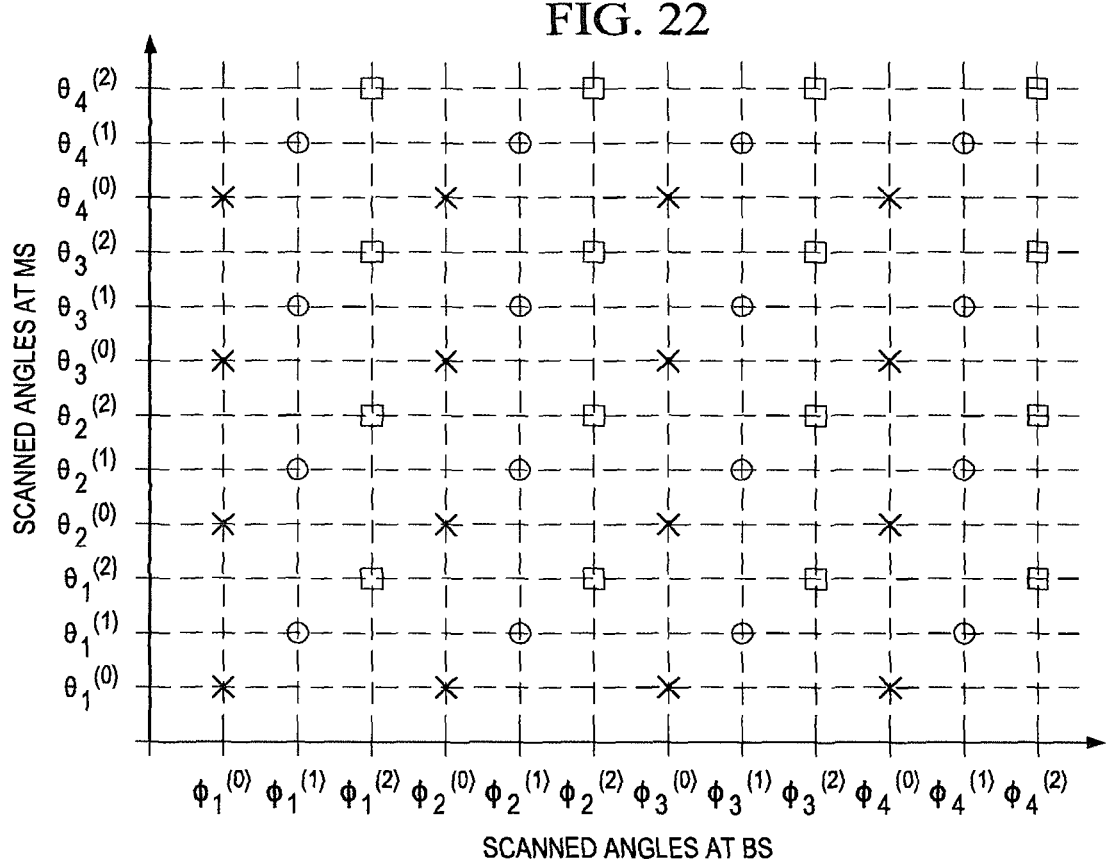
FIG. 22 illustrates a resolution of the scanned angles with spatial staggering according to embodiments of the present disclosure.

In the $P^{th}$ transmission instance, beams 2005 with directions $\{\phi_1^{(P)}, \phi_2^{(P)}, \ldots \phi_N^{(P)}\}$ are transmitted where the beam direction $\phi_i^{(P)} = \phi_i^{(P-1)} + \epsilon_P$. At the $(P+1)^{th}$ transmission instance, the beams 2005 with directions $\{\phi_1^{(0)}, \phi_2^{(0)}, \ldots \phi_N^{(0)}\}$ are transmitted and this cycle of changing beam directions is repeated again. The parameters $\epsilon_i$ called the staggering parameters is greater than or equal to zeros and angular in nature. In one mode of operation, the beam direction at BS 200 is changed slightly at every transmission instance to provide maximum angular coverage of the BS Sector. MS 1600 receives one set of the transmitted reference symbols from BS 200 using receive beamforming beams 2010 $\{\theta_1^{(0)}, \theta_2^{(0)}, \ldots \theta_M^{(0)}\}$ in one instance, $\{\theta_1^{(1)}, \theta_2^{(1)}, \ldots \theta_M^{(1)}\}$ for received the second set of reference symbols, where $\theta_i^{(1)} = \theta_i^{(0)} + \delta_1$, $\{\theta_1^{(2)}, \theta_2^{(2)}, \ldots \theta_M^{(2)}\}$ for receiving the third set of reference symbols, where $\theta_i^{(2)} = \theta_i^{(1)} + \delta_2$. For the $P^{th}$ set of reference symbols, the receiver sets its beamforming weights to $\{\theta_1^{(P)}, \theta_2^{(P)}, \ldots \theta_M^{(P)}\}$ where the beam direction is $\theta_i^{(P)} = \theta_i^{(P-1)} + \delta_P$. To receive the $(P+1)^{th}$ transmitted reference symbol, the beams 2010 with directions) $\{\theta_1^{(0)}, \theta_2^{(0)}, \ldots \theta_M^{(0)}\}$ are used by MS 1600. The parameters $\delta_i$ called the staggering parameters is greater than or equal to zero and angular in nature. The beam direction at MS 1600 is changed at every transmission instance to ensure that all directions are covered. An exemplary illustration of the beams of the different spatially staggered reference symbols at the BS and the MS for P=2 is shown in FIG. 21. The improvement in the resolution of the scanned angles with spatial staggering is illustrated in a 2-D plot shown in FIG. 22. For example, in the example shown in FIG. 22, the x's represent one transmit instance, the o's represent another transmit instance and the square's represent a third transmit instance.

Therefore, both BS 200 and MS 1600 have P+1 staggered orientation sets transmitted in P+1 transmission instances and repeated every P+1 transmission instances. MS 200 uses an estimation process to estimate the angle of arrival $\Theta_k$, angle of departure $\Phi_k$ and the complex channel gain $\beta_k e^{j\psi_k}$ for each of k paths using all or some of its reference symbols transmitted and received using staggered beams.

Figure 23:
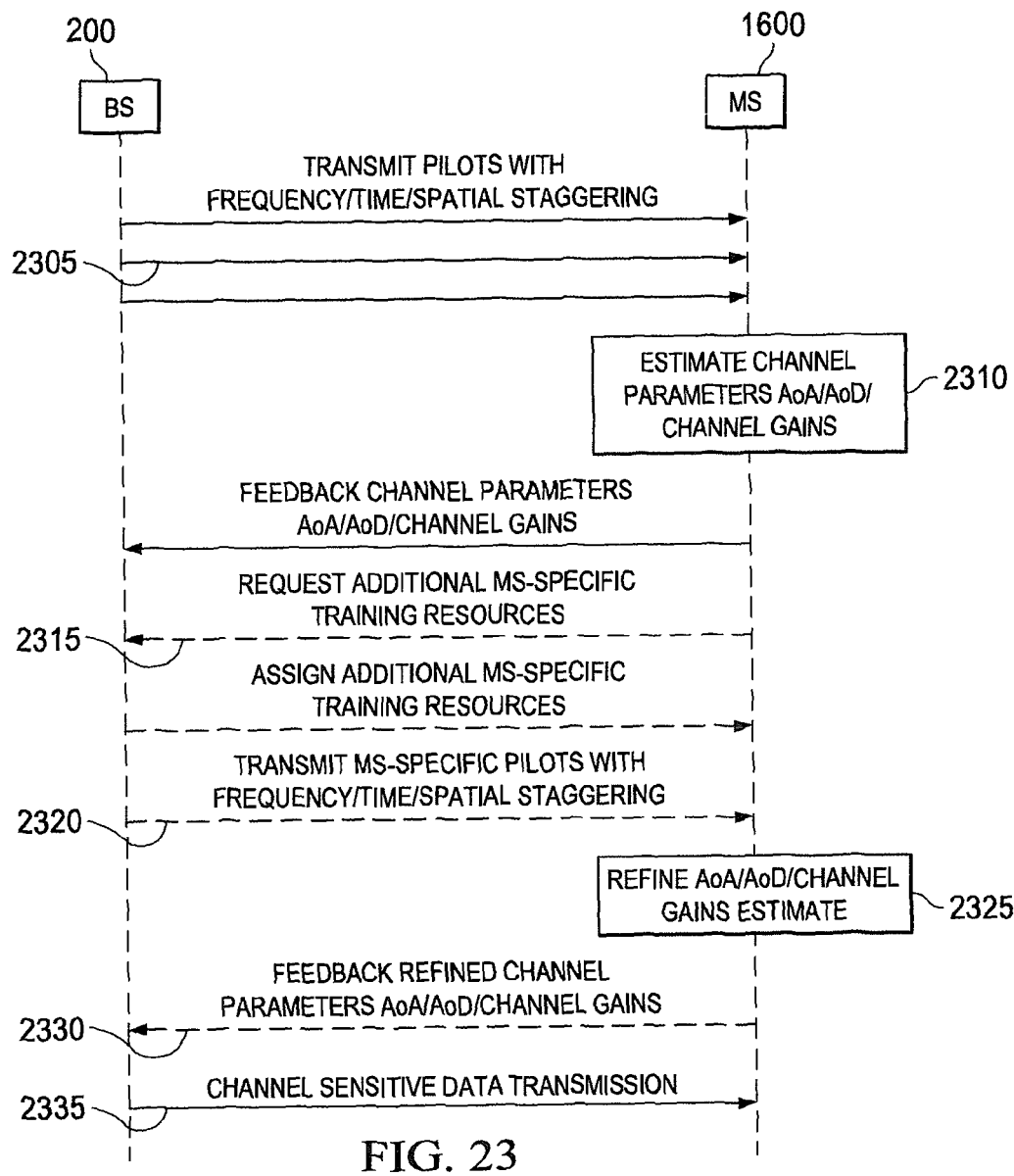
FIG. 23 illustrates a channel parameter estimation and refinement process using frequency, time and spatial staggering according to embodiments of the present disclosure.

FIG. 23 illustrates a channel parameter estimation and refinement process using frequency, time and spatial staggering according to embodiments of the present disclosure. The embodiment of the channel parameter estimation and refinement process 2300 shown in FIG. 23 is for illustration only. Other embodiments could be used without departing from the scope of this disclosure.

BS 200 transmits pilots with frequency, time and spatial staggering in step 2305. MS 1600 estimates channel parameters angle of arrival (AoA), angle of departure (AoD) and complex channel gain in step 2310. In step 2315, MS 1600 transmits the AoD, AoA and the complex channel gain to the BS using an uplink feedback channel. This feedback can take two different forms implicit where the preferred transmit and receive beam orientation is chosen from a codebook or explicit where the values for the AoD, AoA and complex channel gains are quantized and transmitted on the uplink feedback channel.

In addition, in step 2315, one or more MS(s) 1600 also can request additional training in targeted spatial directions to further resolve the AoA and AoD directions and the channel gains. This set of reference symbols are transmitted exclusively for the MS(s) requesting it. A feedback channel will be assigned to the MS for transmitting the improved AoA, AoD and channel gain estimates.

In step 2320, BS 200 also can initiate MS specific training for one or more MSs by sending another set of training beams specific to MS(s) 1600 to further resolve the AoA, AoD directions. In step 2325, MS 1600 refines the AoA, AoD and channel gain. MS 1600 feeds back the refined AoA, AoD and channel gain in step 2330. Thereafter, BS 200 performs a channel sensitive data transmission in step 2335.

In certain embodiments, the channel parameters AoA and AoD are estimated and transmitted only once every Q subframes using the staggered pilots. The channel gains $\beta e^{j\psi k}$ are estimated and transmitted every Q' subframes. A typical configuration has Q'<Q, which implies that the channel gain is estimated and transmitted more frequently than the AoA and AoD estimates.

Figure 24:
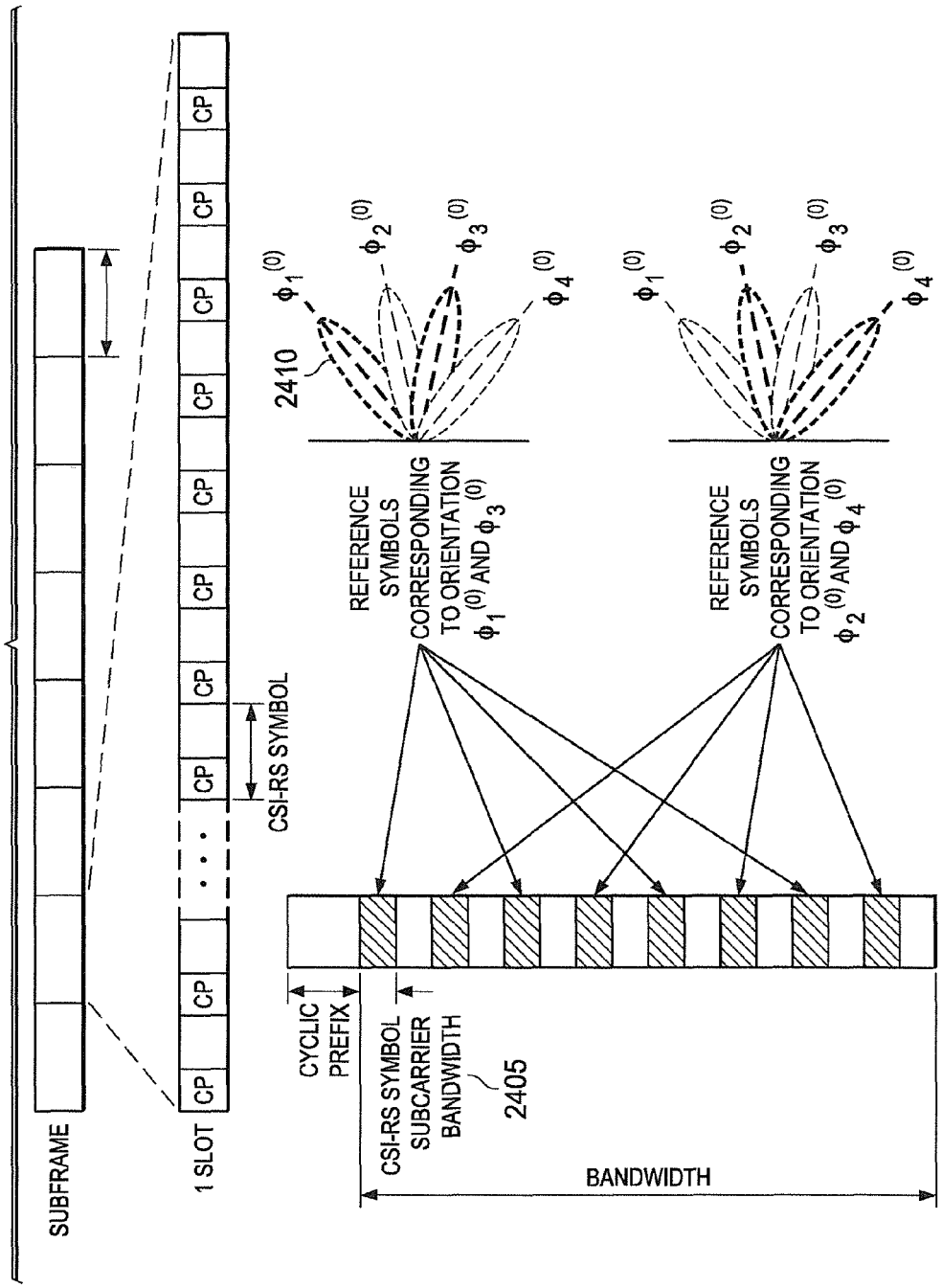
FIG. 24 illustrates shared time-frequency locations for spatially staggered pilots according to embodiments of the present disclosure.

FIG. 24 illustrates shared time-frequency locations for spatially staggered pilots according to embodiments of the present disclosure. The embodiment of the shared time-frequency locations shown in FIG. 24 is for illustration only. Other embodiments could be used without departing from the scope of this disclosure.

In certain embodiments, spatially staggered pilots with different spatial orientations and minimal beam overlap are transmitted on the same time, frequency resource in the OFDM symbol. The OFDM symbol 2405 carrying the reference symbols for CSI estimation using beams 2410 with different orientations can be shown to share a given time-frequency resource location. Therefore, in a given resource location for CSI-RS, two CSI-RS with different spatial orientations are multiplexed using two different RF chains. The spatial orientations are selected such that the interference between the beams in those orientations is minimal. This can be extended further to share time-frequency locations across different instances of spatial staggering, that is, sharing time frequency locations for beams with spatial orientations $\phi_0^{(0)}$ and $\phi_2^{(2)}$, and so forth.

In certain embodiments, the spatial staggering arrangement is coordinated across multiple cells so that inter-cell interference due to colliding beams is reduced and robust estimates of the channel gains and the angular information can be derived.

Figure 25:
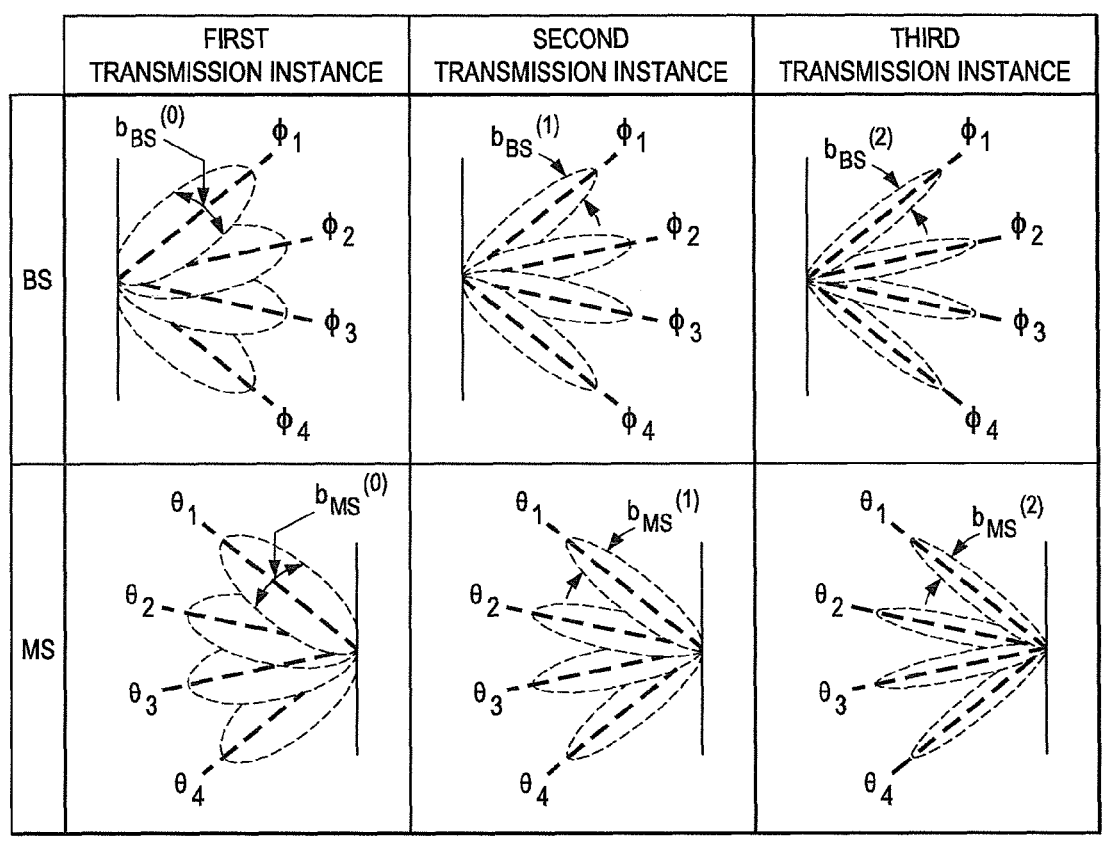
FIG. 25 illustrates a reference symbol transmission with staggered beam-widths for transmission and reception according to embodiments of the present disclosure.

FIG. 25 illustrates a reference symbol transmission with staggered beam-widths for transmission and reception according to embodiments of the present disclosure. The embodiment of the spatial staggering with varying beam widths shown in FIG. 25 is for illustration only. Other embodiments could be used without departing from the scope of this disclosure.

In certain embodiments, BS 200 transmits one set of reference symbols using beams with directions $\{\phi_1, \phi_2, \ldots \phi_N\}$ whose 3-dB beam width $b_{BS}^{(0)}$ in one instance of transmission, $\{\phi_1, \phi_2, \ldots \phi_N\}$ in the another instance of transmission with the 3-dB beam width $b_{BS}^{(1)}$, $\{\phi_1, \phi_2, \ldots \phi_N\}$ in another instance of transmission with the 3-dB beamwidth $b_{BS}^{(2)}$. In the $P^{th}$ transmission instance, beams are transmitted in the same direction $\{\phi_1, \phi_2, \ldots \phi_N\}$ with the 3-dB beamwidth $b_{BS}^{(P)}$. From the $(P+1)^{th}$ transmission instance, the reference symbols with directions $\{\phi_1, \phi_2, \ldots \phi_N\}$ whose 3-dB beam width $b_{BS}^{(0)}$ are transmitted and this cycle repeats again. The beam-widths are altered at every instance of the reference symbol transmission while the spatial orientation of the beam is kept the same. In one mode of operation, at every successive instance of transmission, the beamwidth is refined, that is, $b_{BS}^{(0)} > b_{BS}^{(1)} > b_{BS}^{(2)} > \ldots > b_{BS}^{(P)}$. MS 1600 receives one set of the transmitted reference symbols from BS 200 using receive beamforming beams that are fixed at $\{\theta_1, \theta_2, \ldots \theta_N\}$ but whose 3-dB beam width is $b_{MS}^{(0)}$ in one instance, with beamwidth $b_{MS}^{(1)}$ for receiving the second set of reference symbols, with beamwidths $b_{MS}^{(2)}$ for receiving the third set of reference symbols. For the $P^{th}$ set of reference symbols, the receiver sets its beamforming weights to $\{\theta_1, \theta_2, \ldots, \theta_M\}$ with beam width $b_{MS}^{(P)}$. To receive the $(P+1)^{th}$ transmitted reference symbol, the beams with directions $\{\theta_1, \theta_2, \ldots \theta_M\}$ with beamwidths $b_{MS}^{(0)}$ are used by MS 1600. The beam-widths are altered at every instance of the reference symbol reception while the spatial orientation of the beam is kept the same.

In certain embodiments, BS 200 transmits one set of reference symbols using beams with directions $\{\phi_1^{(0)}, \phi_2^{(0)}, \ldots \phi_N^{(0)}\}$ with beamwidth $b_{BS}^{(0)}$ in one instance of transmission, $\{\phi_1^{(1)}, \phi_2^{(1)}, \ldots \phi_N^{(1)}\}$ in the another instance of transmission where $\phi_i^{(1)} = \phi_i^{(0)} + \epsilon_1$ with beamwidth $b_{BS}^{(1)}$ $\{\phi_1^{(2)}, \phi_2^{(2)}, \ldots \phi_N^{(2)}\}$ in another instance of transmission where $\phi_i^{(2)} = \phi_i^{(1)} + \epsilon_2$ with beamwidth $b_{BS}^{(2)}$ until p transmission instances of the reference symbols are transmitted. In the $P^{th}$ transmission instance, beams with directions $\{\phi_1^{(P)}, \phi_2^{(P)}, \ldots \phi_N^{(P)}\}$ are transmitted where the beam direction $\phi_i^{(P)} = \phi_i^{(P-1)} + \epsilon_P$ with beamwidth $b_{BS}^{(P)}$. At the $(P+1)^{th}$ transmission instance, the beams with directions $\{\phi_1^{(0)}, \phi_2^{(0)}, \ldots \phi_N^{(0)}\}$ are transmitted with beamwidth $b_{BS}^{(0)}$ and this cycle of changing beam directions and the 3-dB beamwidth is repeated again. The parameters $\epsilon_i$ called the staggering parameters are non-zero and angular in nature; the 3-dB beamwidths can be altered to refine or widened at every transmission instances, then $b_{BS}^{(0)} > b_{BS}^{(1)} > B_{BS}^{(2)} > \ldots > b_{BS}^{(P)}$. The beam direction and the beam width at BS 200 are changed slightly at every transmission instance to provide maximum angular coverage and beamforming gain of the BS Sector. MS 1600 receives one set of the transmitted reference symbols from BS 200 using receive beamforming beams $\{\theta_1^{(0)}, \theta_2^{(0)}, \ldots \theta hd M^{(0)}\}$ with 3-dB beam width $b_{BS}^{(0)}$ in one instance, $\{\theta_1^{(1)}, \theta_2^{(1)}, \ldots \theta_M^{(1)}\}$ with 3-dB beam width $b_{BS}^{(1)}$ for receiving the second set of reference symbols, where $\theta_i^{(1)} = \theta_i^{(0)} + \delta_1$, $\{\theta_1^{(2)}, \theta_2^{(2)}, \ldots \theta_M^{(2)}\}$ 3-dB beam width is $b_{MS}^{(2)}$ for receiving the third set of reference symbols, where $\theta_i^{(2)} = \theta_i^{(1)} + \delta_2$. For the $P^{th}$ set of reference symbols, the receiver sets its beamforming weights to $\{\theta_1^{(P)}, \theta_2^{(P)}, \ldots \theta_M^{(P)}\}$ where the beam direction is $\theta_i^{(1)} = \theta_i^{(P-1)} + \delta_P$ and 3-dB beam width is $b_{MS}^{(P)}$. To receive the $(P+1)^{th}$ transmitted reference symbol, the beams with directions $\{\theta_1^{(0)}, \theta_2^{(0)}, \ldots \theta hd M^{(0)}\}$ with 3-dB beam width $b_{MS}^{(0)}$ are used by MS 1600. The parameters $\delta_i$ called the staggering parameters are non-zero and angular in nature; the 3-dB beamwidths can be altered at every instance of reference symbol reception. The beam direction and the 3-dB beam-widths at MS 1600 are changed at every transmission instance to ensure that all directions are covered.

In certain embodiments, MS 1600 estimates the channel using the probed measurements at directions from which the reference symbols are transmitted by BS 200 and received at MS 1600. For every probed beam directions $\phi_m$ and $\theta_n$ on which the reference symbols are sent, the received signal at the receiver contains the contributions from the narrow band channel response as described in the equation below:

$$P(\phi_m,\theta_n)=\Sigma_{k=1}{}^K\beta_k e_k{}^{j\psi k}g_{BS}(\Phi_k-\phi_m)g_{MS}(\Theta_k-\theta_n)+\eta(\phi_m,\theta_n) \quad [\text{Eqn. 1}]$$

where $g_{BS}(\phi)$ and $g_{MS}(\theta)$ are the BS and MS beam responses at angles $\phi$ and $\theta$ respectively, $\eta$ is the system noise. $\phi=0$ and $\theta=0$ correspond to main lobe peaks. The receiver uses an iterative beam subtraction process to estimate the angle of arrival, angle of departure and channel gains based on observed channel measurements for known beam directions similar to the CLEAN algorithm in B. Jeffs, et al., "A wireless MIMO channel probing approach for arbitrary antenna arrays", Proc. Of ICASSP, 2001, March 2001, the contents of which are hereby incorporated by reference in their entirety, which is well suited for de-convolving blurred point source images like this discrete ray angle map.

Figure 26:
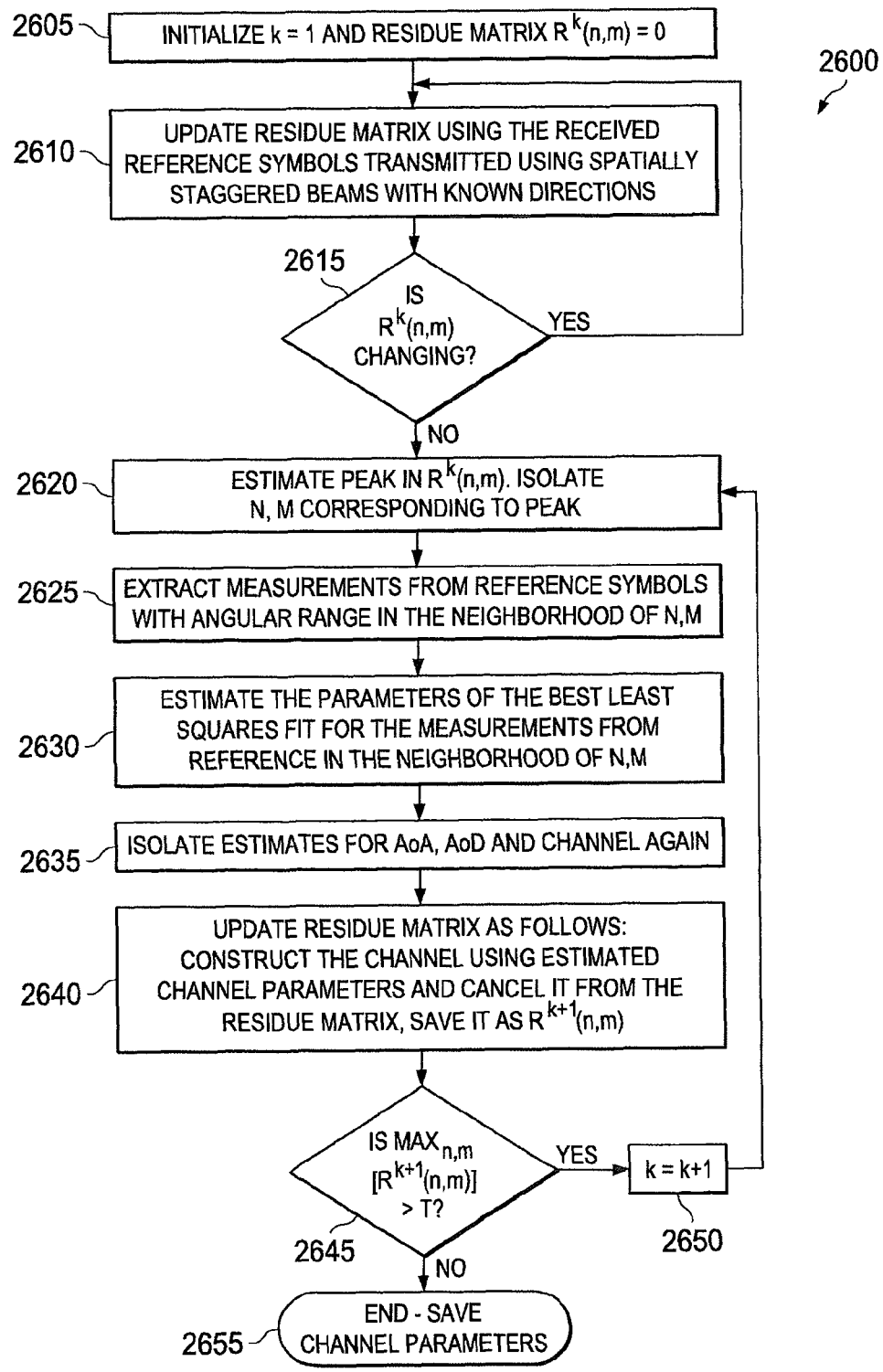
FIG. 26 illustrates a channel estimation process according to embodiments of the present disclosure.

FIG. 26 illustrates a channel estimation process according to embodiments of the present disclosure. The embodiment of the channel estimation process 2600 shown in FIG. 26 is for illustration only. Other embodiments could be used without departing from the scope of this disclosure.

In step 2605, MS 1600 initializes a Channel Residue Matrix: $k=1$, $R^1(\phi_n, \theta_m)=P(\phi_n, \theta_m)$ where: $\phi_n \subseteq \{\phi_1{}^{(0)}, \phi_2{}^{(0)}, \ldots \phi_N{}^{(0)}, \phi_1{}^{(1)}, \phi_2{}^{(1)}, \ldots \phi_N{}^{(1)} \ldots, \phi_1{}^{(P)}, \phi_2{}^{(P)}, \ldots \phi_N{}^{(P)}\}$ and $\theta_m \subseteq \{\theta_1{}^{(0)}, \theta_2{}^{(0)}, \ldots \theta_M{}^{(0)}, \theta_1{}^{(1)}, \theta_2{}^{(1)}, \ldots \theta_M{}^{(1)}, \ldots, \theta_1{}^{(P)}, \theta_2{}^{(P)}, \ldots \theta_M{}^{(P)}\}$. In step 2610, MS 1600 constructs the channel residue matrix by collecting the channel observations over all or some of the P transmitted instances of the spatially staggered reference symbols—if the channel residue matrix does not evolve over successive transmission instances of the reference symbols, in step 2615, then the estimation process moves to step 2620.

In step 2620, MS 1600 estimates a peak in $R^k(n,m)$ and isolates N, M corresponding to the peak:

$$N, M = \arg\max_{\{m,n\}} |R^k(\phi_n, \theta_m)|. \quad [\text{Eqn. 2}]$$

In step 2625, MS 1600 extracts measurements from reference symbols with angular range in the neighborhood of N,M. MS 1600 forms the residue vector around neighborhood of peak:

$$p=\text{vec}\{R^k(\phi_n,\theta_m)\}, \forall (n,m) \in \mathcal{N}\{(N,M)\} \quad [\text{Eqn. 3}]$$

In step 2630, MS 1600 estimates the parameters of the best least squares fit for the measurements from the reference in the neighborhood of N,M. MS 1600 finds the least squares fit to the residual peak for a shifted, complex scaled, 2-D probing beam response $$\alpha_{opt}, \Delta_\phi, \Delta_\theta = \arg\max_{\{\alpha,\delta_\phi,\delta_\theta\}} \|p - \alpha \hat{p}(\delta_\phi, \delta_\theta)\|^2 \quad [\text{Eqn. 4}]$$

$$\hat{p}(\delta_\phi, \delta_\theta) = \text{vec}\{g_{BS}(\phi_n - \phi_N - \delta_\phi)_{(60)} \times g_{MS}(\theta_n - \theta_N - \delta_\theta)_{(360)} \, \forall\, (n,m) \in \mathcal{N}\{(N,M)\}\} \quad [\text{Eqn. 5}]$$

$$\alpha_{opt} = \frac{\hat{p}p}{\hat{p}^H \hat{p}} \quad [\text{Eqn. 6}]$$

In step 2635, MS 1600 isolates estimates for AoA, AoD and channel gain. Then, in step 2640, MS 1600 updates the residue matrix by constructing the channel matrix using estimated channel parameters; cancels it from the residue matrix; and saves it as $R^{k+1}(n,m)$. For example, MS 1600:

adds ray parameters to the model $$\hat{C}(\phi,\theta); \hat{\beta}_k=|\alpha|, \hat{\psi}_k=\angle\alpha, \hat{\Phi}_k=\phi_N+\Delta_\phi, \hat{\Theta}_k=\theta_M+\delta_\theta \quad [\text{Eqn. 7}]$$

removes the ray peak from residual:

$$R^{\{K+1\}}(\phi_n,\theta_m)=R^k(\phi_n,\theta_m)-\alpha_{opt}g_{BS}(\phi_n-\hat{\Phi}_k)_{(60)}g_{MS}(\theta_m-\hat{\Theta}_k)_{(360)} \quad [\text{Eqn. 8}]$$

Subscript (360) indicates modulo 360 degree periodic angle addition and $\mathcal{N}\{(N,M)\}$ is the set of 2-D samples, (n,m), in the neighborhood of (N,M). A typical neighborhood contains the main lobes of $g_{Bs}$ and $g_{MS}$. T is the threshold determined for termination.

In step 2645, if $\max_{\{n,m\}}|R^k(\phi_n,\theta_m)|>T$, $k=k+1$, MS 1600 increments k by one in step 2650 and returns to step 2615. Otherwise, the process ends in step 2655.

Although the figures described above have illustrated various embodiments, any number of modifications could be made to these figures. For example, any suitable type of system or could be used. Further, while FIGS. 14, 17, 23 and 26 illustrate various series of steps, various steps in FIGS. 14, 17, 23 and 26 could overlap, occur in parallel, occur multiple times, or occur in a different order. In addition, each component in a device or system could be implemented using any suitable structure for performing the described function(s).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a base station capable of communicating with a plurality of subscriber stations using a beamforming scheme, the base station comprising:
   a plurality of antenna arrays configured to transmit N spatial beams; and
   $N_{RF}$ number of radio frequency (RF) processing chains coupled to respective ones of the plurality of antenna arrays, wherein $N \gg N_{RF}$, wherein a first of the RF processing chains is configured to carry a reference symbol corresponding to a specific spatial beam.

2. The base station as set forth in claim 1, wherein the $N_{RF}$ RF processing chains are configured to transmit different spatial beams in at least $N/N_{RF}$ time instances.

3. The base station as set forth in claim 1, wherein the $N_{RF}$ RF processing chains are configured to transmit the different spatial beams in the at least $N/N_{RF}$ time instances in different directions.

4. For use in a wireless communications network, a base station capable of communicating with a plurality of subscriber stations using a beamforming scheme, the base station comprising:
   a plurality of antenna arrays configured to transmit N spatial beams; and
   $N_{RF}$ number of radio frequency (RF) processing chains coupled to respective ones of the plurality of antenna arrays, wherein $N \gg N_{RF}$, wherein at least one RF processing chain is configured to reduce a duration of an Orthogonal Frequency Division Multiplexing (OFDM) symbol that carries a reference symbol such that the duration of the OFDM symbol that carries a reference symbol is shorter than a duration of a symbol for data transmission, wherein the symbol that carries the reference symbol includes fewer subcarriers as compared to the symbol for data transmission.

5. The base station as set forth in claim 4, wherein a cyclic prefix for the symbol that carries the reference symbol is the same as the symbol for data transmission.

6. The base station as set forth in claim 4, wherein a plurality of the symbol that carries the reference symbol are configured to fit within a duration of the symbol for data transmission.

7. The base station as set forth in claim 4, wherein each of a plurality of the symbols that carries the reference symbol carries reference symbols corresponding to N spatial beams with at least $N_{RF}$ spatial beams per symbol.

8. The base station as set forth in claim 4, wherein reducing the duration of the OFDM symbol comprises increasing a sampling frequency.

9. For use in a wireless communications network, a method for beamforming, the method comprising:
transmitting N spatial beams by $N_{RF}$ number of radio frequency (RF) processing chains, wherein $N >> N_{RF}$, and wherein transmitting comprises carrying a reference symbol corresponding to a specific spatial beam.

10. The method as set forth in claim 9, wherein transmitting comprises, transmitting, by each of the $N_{RF}$ RF processing chains, different spatial beams in at least $N/N_{RF}$ time instances.

11. The method as set forth in claim 10, wherein transmitting the different spatial beams at least $N/N_{RF}$ time instances comprises transmitting in different directions.

12. For use in a wireless communications network, a method for beamforming, the method comprising:
transmitting N spatial beams by $N_{RF}$ number of radio frequency (RF) processing chains, wherein $N >> N_{RF}$; and
reducing a duration of a symbol that carries a reference symbol such that the duration of a symbol that carries a reference symbol is shorter than a duration of a symbol for data transmission, wherein the symbol that carries the reference symbol includes fewer subcarriers as compared to the symbol for data transmission.

13. The method as set forth in claim 12, wherein a cyclic prefix for the symbol that carries the reference symbol is the same as the symbol for data transmission.

14. The method as set forth in claim 12, wherein a plurality of the symbol that carries the reference symbol are configured to fit within a duration of the symbol for data transmission.

15. The method as set forth in claim 12, wherein each of a plurality of the symbols that carries the reference symbol carries reference symbols corresponding to N spatial beams with at least $N_{RF}$ spatial beams per symbol.

16. The method as set forth in claim 12, wherein reducing the duration of the symbol comprises increasing a sampling frequency.

17. For use in a wireless communications network, a subscriber station capable of communicating with at least one base station using a beamforming scheme, the subscriber station comprising:
a plurality of antenna arrays configured to receive M spatial beams; and
$M_{RF}$ number of radio frequency (RF) processing chains coupled to respective ones of the plurality of antenna arrays, wherein $M >> M_{RF}$, wherein a first of the RF processing chains is configured to receive a reference symbol corresponding to a specific spatial beam.

18. The subscriber station as set forth in claim 17, wherein $M_{RF}$ RF processing chains are configured to receive different spatial beams in at least each of $M/M_{RF}$ time instances.

19. The subscriber station as set forth in claim 18, wherein the $M_{RF}$ RF processing chains are configured to use the reference symbols received on the different spatial beams to estimate a wireless channel between the subscriber station and the at least one base station.

20. The subscriber station as set forth in claim 18, wherein the different spatial beams in at least each of $M/M_{RF}$ time instances are transmitted by the at least one base station in different directions.

21. The subscriber station as set forth in claim 17, wherein at least one symbol comprises a shortened symbol that carries a reference symbol is received, the shortened symbol having a duration that is shorter than a duration of a symbol for data transmission.

22. The subscriber station as set forth in claim 21, wherein the shortened symbol includes fewer subcarriers as compared to the symbol for data transmission.

23. The subscriber station as set forth in claim 21, wherein a cyclic prefix for the shortened symbol is the same as the symbol for data transmission.

24. The subscriber station as set forth in claim 21, wherein a plurality of the shortened symbol are configured to fit within a duration of the symbol for data transmission.

25. The subscriber station as set forth in claim 21, wherein each of a plurality of the symbols that carries the reference symbol carries a reference symbol corresponding to N spatial beams with $N_{RF}$ spatial beams per symbol.

* * * * *